United States Patent
Lee

(10) Patent No.: US 9,971,432 B2
(45) Date of Patent: May 15, 2018

(54) TOUCH PANEL HAVING ELECTRODES WITH DIFFERENT RESISTANCE AND DISPLAY DEVICE INCLUDING THE SAME

(71) Applicant: LG ELECTRONICS INC., Seoul (KR)

(72) Inventor: Weonwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/992,399

(22) Filed: Jan. 11, 2016

(65) Prior Publication Data
US 2016/0328036 A1 Nov. 10, 2016

(30) Foreign Application Priority Data

May 6, 2015 (KR) .................. 10-2015-0062916
May 6, 2015 (KR) .................. 10-2015-0062918

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01)

(58) Field of Classification Search
CPC ................................ G06F 3/041; G06F 3/044
USPC ........................................................ 345/173
See application file for complete search history.

(56) References Cited

U.S. PATENT DOCUMENTS

| 2009/0262095 A1* | 10/2009 | Kinoshita | G06F 3/044 345/174 |
| 2011/0062969 A1* | 3/2011 | Hargreaves | G06F 3/044 324/658 |
| 2012/0098760 A1 | 4/2012 | Chuang | |
| 2013/0002572 A1* | 1/2013 | Jin | G02F 1/133305 345/173 |
| 2013/0277186 A1 | 10/2013 | Sekizawa et al. | |
| 2014/0198266 A1* | 7/2014 | Park | G02F 1/13338 349/12 |
| 2014/0210743 A1* | 7/2014 | Kurasawa | G06F 3/041 345/173 |
| 2015/0116243 A1* | 4/2015 | Saitou | G06F 3/041 345/173 |

OTHER PUBLICATIONS

European Search Report dated Sep. 5, 2016 issued in Application No. EP 16152710.6 (Full English Text).

* cited by examiner

*Primary Examiner* — Long D Pham
(74) *Attorney, Agent, or Firm* — Ked & Associates, LLP

(57) ABSTRACT

A touch panel and a display device including the same are disclosed. The touch panel in a curved state includes a first electrode that includes a plurality of electrode parts spaced apart from each other. The plurality of electrode parts include a first electrode part, extending through the center region of the touch panel, and a second electrode part extending through a lateral side region of the touch panel. The second electrode part has a lower resistance than the first electrode part.

17 Claims, 17 Drawing Sheets

FIG. 6
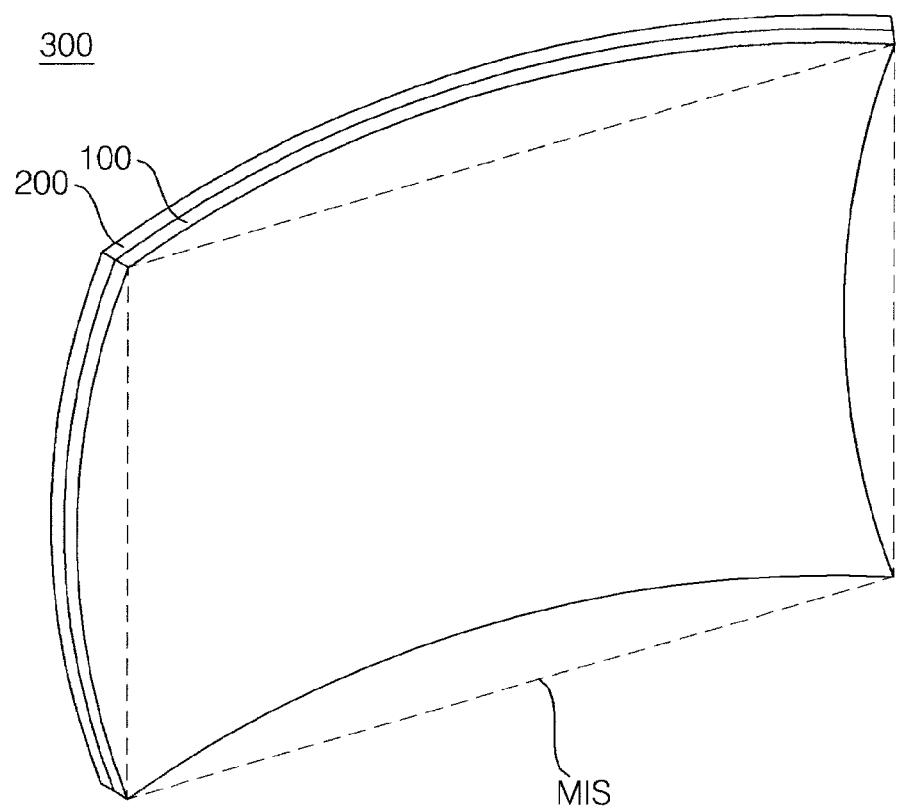
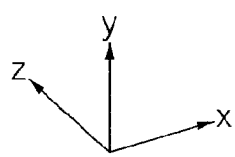

FIG. 9
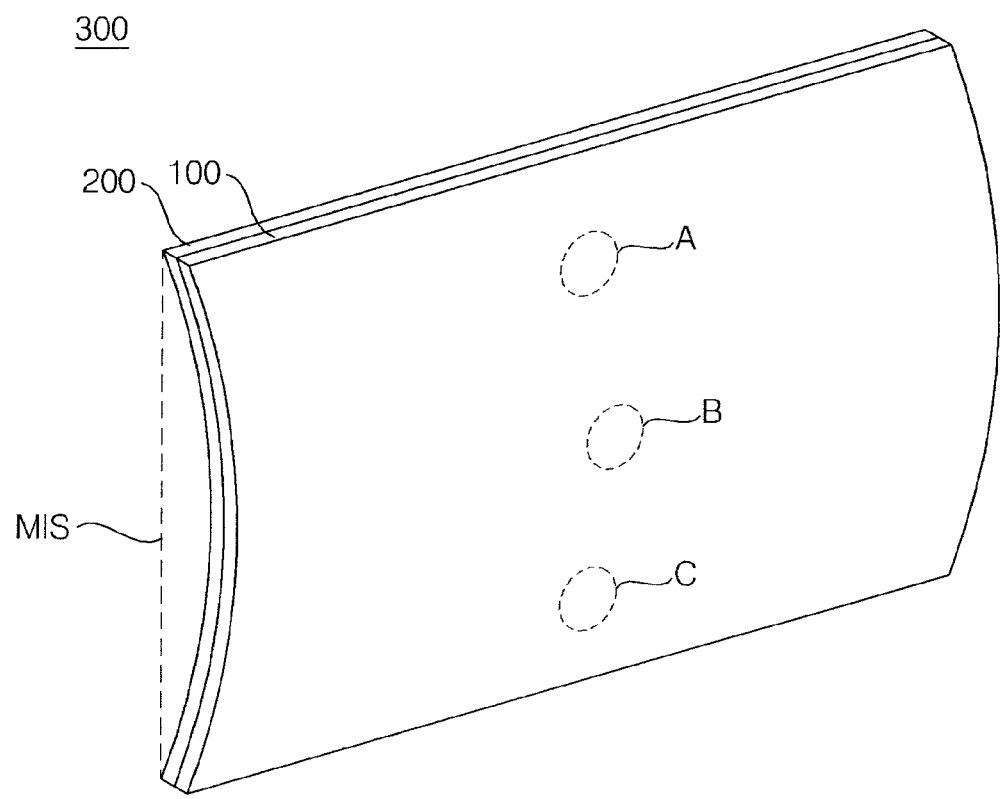
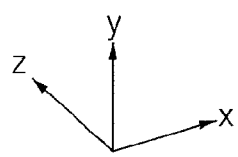

FIG. 10
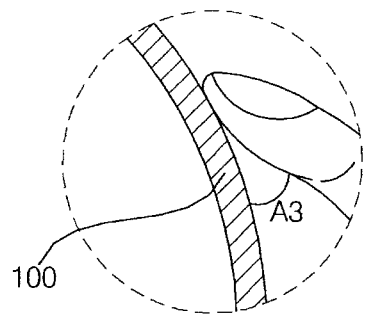
(a)
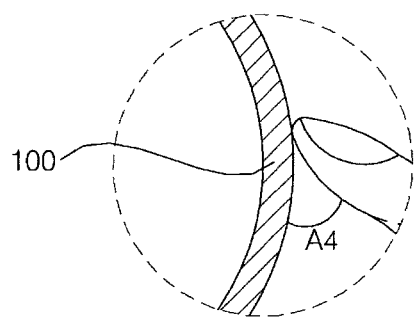
(b)
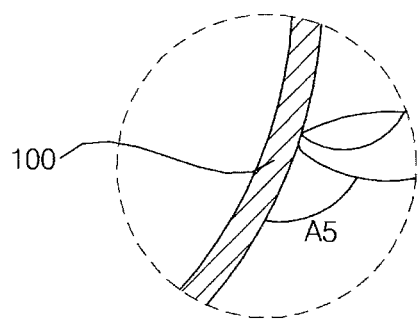
(c)

ABSTRACT FOR PATENT US 9,971,432 B2

TOUCH PANEL HAVING ELECTRODES WITH DIFFERENT RESISTANCE AND DISPLAY DEVICE INCLUDING THE SAME

CROSS-REFERENCE TO RELATED APPLICATIONS

This application claims the priority benefit of Korean Patent Applications Nos. 10-2015-0062916, filed on May 6, 2015 and 10-2015-0062918, filed on May 6, 2015 in the Korean Intellectual Property Office, the disclosure of which is incorporated herein by reference.

BACKGROUND

1. Field

The present invention relates to a touch panel and a display device including the same, and more particularly to a touch panel having an improved structure and a display device including the same.

2. Background

Recently, touch panels have been applied to various electronic apparatuses such as display devices for user convenience. Such a touch panel is provided with electrodes each of which includes a plurality of electrode parts having uniform width and spacing for uniform detection of touch.

With the expansion of the fields of application of display devices, various properties are required for the respective use applications. Specifically, requirements associated not only with simple image display but also with stereoscopic effect, immersion and the like are increased. In order to meet this variety of requirements, display devices that are manufactured in a curved state or to have a curved structure have become commercially available in the market.

However, when an electrode of a touch panel applied to such a display device includes a plurality of electrode parts having uniform width and spacing, the contact area or touch area defined by a touch device (such as a finger or a stylus pen) with respect to a curved touch panel may vary from one region to another. Consequently, it may be impossible to achieve normal touch or accurate detection of touch in a region in which a contact area is small.

BRIEF DESCRIPTION OF THE DRAWINGS

The embodiments will be described in detail with reference to the following drawings in which like reference numerals refer to like elements wherein:

The above and other objects, features and other advantages of the present invention will be more clearly understood from the following detailed description taken in conjunction with the accompanying drawings, in which:

FIG. 6 is a perspective view schematically showing the curved state of a display device including a touch panel according to another embodiment of the present invention;

FIG. 9 is a perspective view schematically showing the curved state of a display device including a touch panel according to a further embodiment of the present invention;

FIG. 10 is a cross-sectional view schematically showing the touch device and the touch panel at A, B and C portions in FIG. 9;

DETAILED DESCRIPTION

Figure 1:
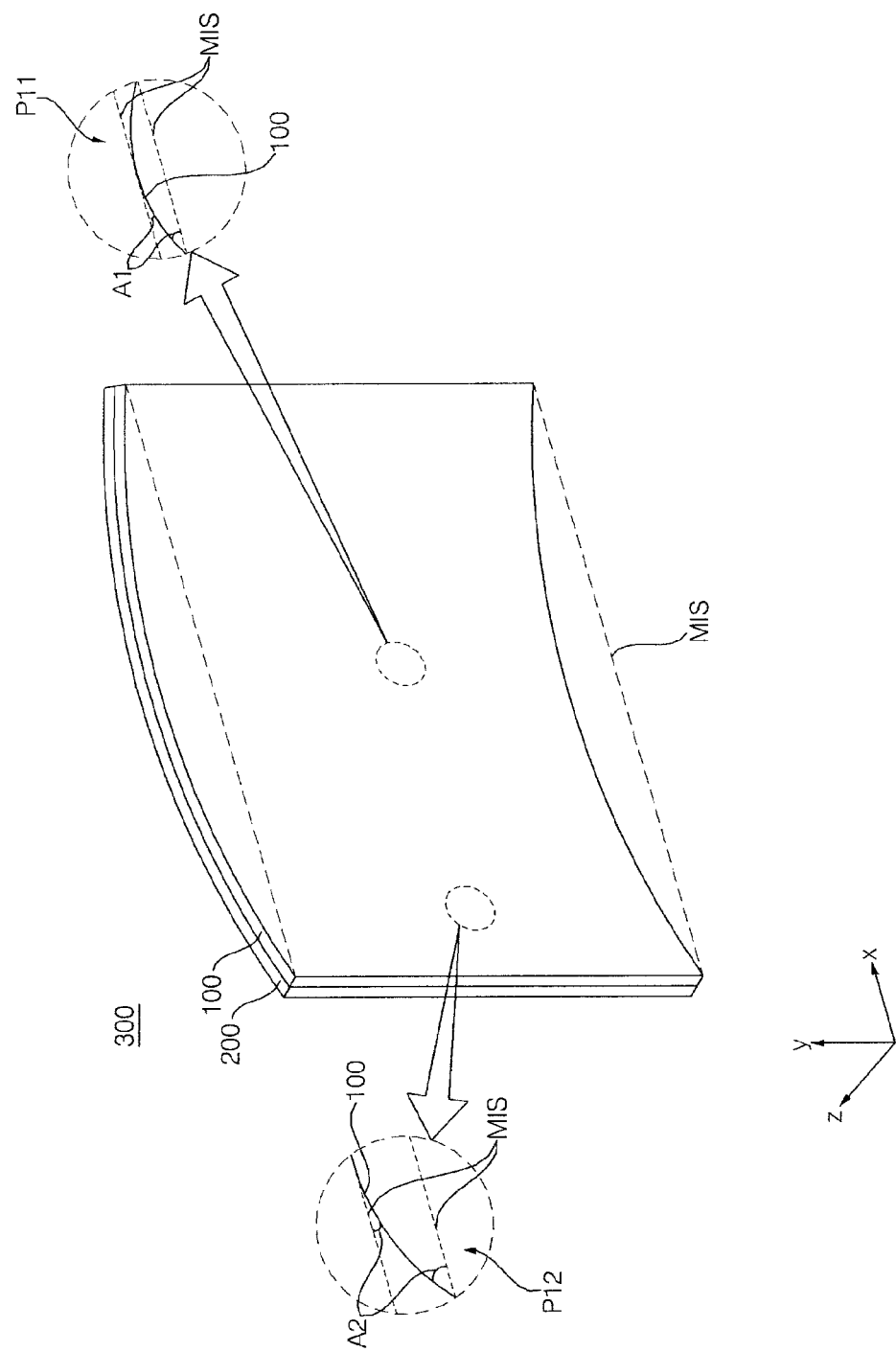
FIG. 1 is a perspective view schematically showing the curved state of a display device including a touch panel according to an embodiment of the present invention.

Reference will now be made in detail to the preferred embodiments of the present invention, examples of which are illustrated in the accompanying drawings. However, it will be understood that the present invention should not be limited to the embodiments, and may be modified in various ways.

In the drawings, to clearly and briefly explain the present invention, the illustration of elements having no connection with the description is omitted, and the same or extremely similar elements are designated by the same reference numerals throughout the specification. In addition, in the drawings, for more clear explanation, the dimensions of elements, such as thickness, width, and the like, are exaggerated or reduced, and thus the thickness, width, and the like of the present invention are not limited to the illustration of the drawings.

In the entire specification, when an element is referred to as "including" another element, the element should not be understood as excluding other elements so long as there is no special conflicting description, and the element may include at least one other element. In addition, it will be understood that, when an element such as a layer, film, region or substrate is referred to as being "on" another element, it can be directly on the other element, or intervening elements may also be present. IN contrast, when an element such as a layer, film, region or substrate is referred to as being "directly on" another element, this means that there are no intervening elements therebetween.

It will be understood that the terms "first," "second," "third", "fourth" etc. used throughout this specification are intended to distinguish elements from each other, and the present invention should not be limited by these terms.

Hereinafter, a touch panel and a display device including the same according to an embodiment of the present invention will be described in detail with reference to the accompanying drawings.

FIG. 1 is a perspective view schematically showing the curved state of the display device including the touch panel according to an embodiment of the present invention.

Referring to the FIG. 1, the display device 300 according to this embodiment includes a display panel 200, along with a touch panel 100 integrally mounted on the display panel 200.

Various known display panels may be applied as the display panel 200 disposed behind the touch panel 100 to display an image. A liquid crystal display panel, an organic light emitting diode display panel, or the like may be used as a display panel 200. The touch panel 100 may be fixed to the front surface of the display panel 200 by means of an adhesive layer, a fastening member or the like.

In this embodiment, the display device 300 may have a curved state with a predetermined curvature. For example, the display panel 200 is maintained in a curved state with a predetermined curvature by various ways and fixing structures, and the touch panel 100 in a curved state may be fixed to the display panel 200 having the curved surface. In another example, the display panel 200 and the touch panel 100, which are flexible, are deformed into a curved state with a predetermined curvature by application of external force, an external signal and the like when necessary, so that the curved state may be temporarily or conditionally maintained. In addition, various deformations may be possible.

Figure 2:
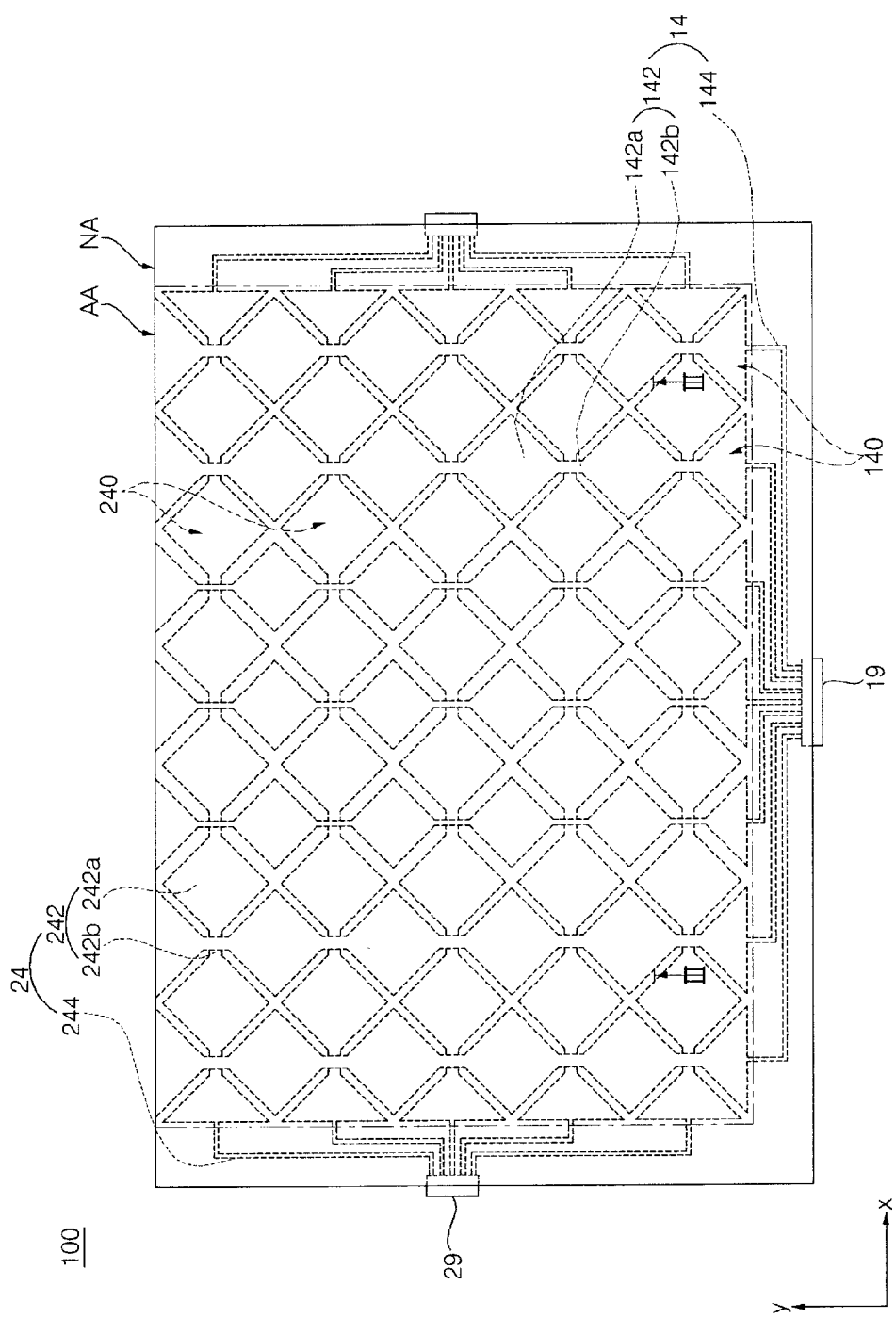
FIG. 2 is a plan view schematically showing the touch panel of FIG. 1.
Figure 3:
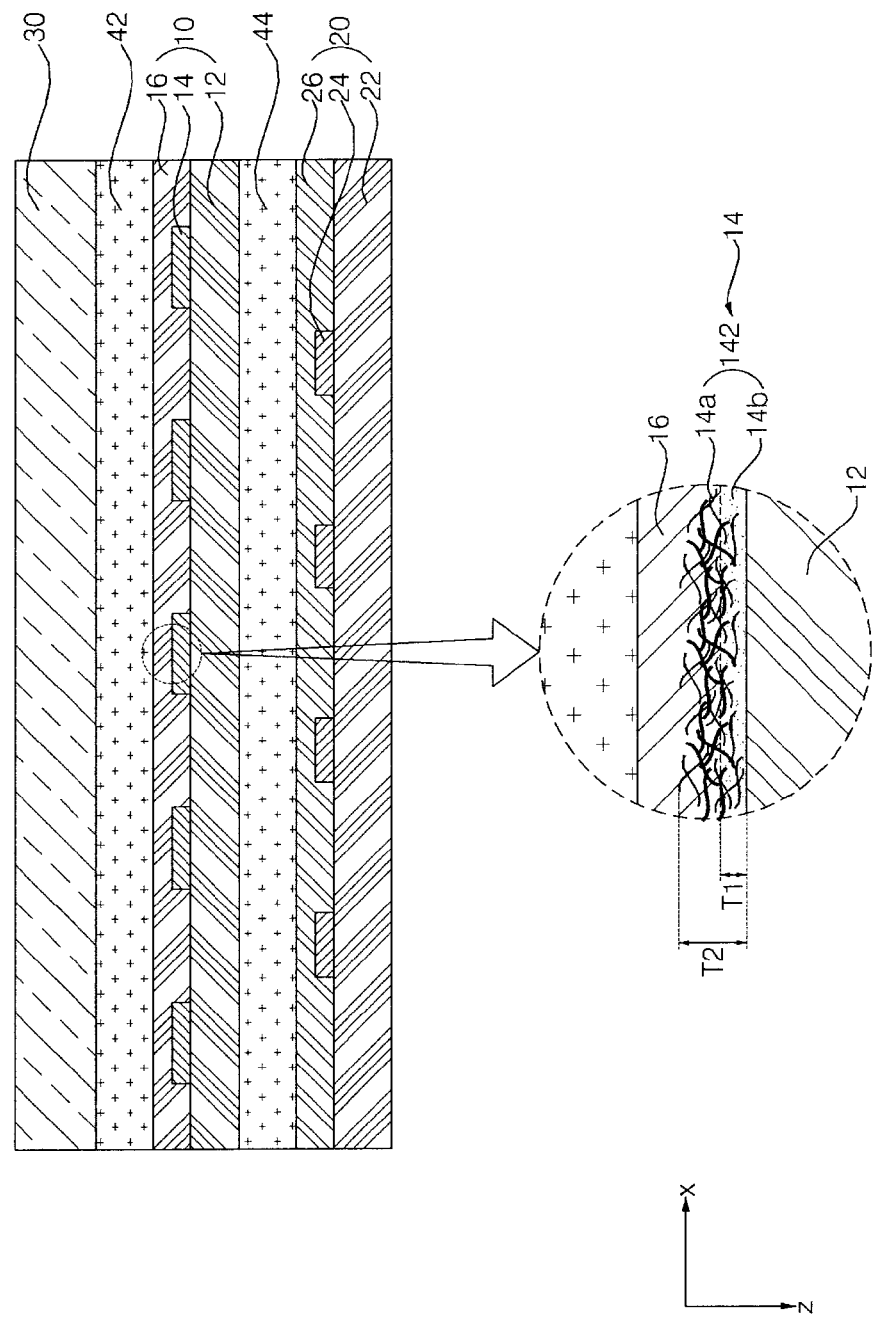
FIG. 3 is a cross-sectional view taken along line III-III of FIG. 2.

FIG. 2 is a plan view schematically showing the touch panel of FIG. 1. FIG. 3 is a cross-sectional view taken along line III-III of FIG. 2. For more clear and simple illustration, FIG. 2 mainly shows first and second electrodes 14 and 24, and the illustration of first and second transparent adhesive layers 42 and 44, first and second base members 12 and 22, first and second overcoating layers 16 and 26 and the like are omitted.

As shown in FIGS. 1 to 5, the touch panel 100 according to this embodiment may include an effective region AA and a non-effective region NA positioned outside the effective region AA. The effective region AA is provided with sensor electrode parts 142 and 242 of the first and second electrodes 14 and 24 to detect touch of an input device such as a user's finger, a stylus pen or the like. The non-effective region NA is provided with flexible printed circuit boards (FPCBs) 19 and 29 connected to an external circuit (for example, a touch control unit (not shown) for controlling the touch panel 100 in the display device), wiring parts 144 and 244 of the first and second electrodes 14 and 24 and the like so as to transfer information detected in the effective region AA. Furthermore, the non-effective region NA may be provided with a bezel (not shown) or a black printed layer (not shown) and the like for mechanically holding various layers and components constituting the touch panel 100 and for shielding various structures disposed in the non-effective region NA. This embodiment illustrates an example in which the non-effective region NA is disposed around the effective region AA. However, the present invention is not limited thereto, and various modifications in which the non-effective region NA is not positioned as viewed from the front or the plan view are possible.

The touch panel 100 includes the first electrode 14, and the second electrode 24, disposed to be insulated from the first electrode 14. The first electrode 14 includes a plurality of electrode parts 140 which are spaced apart from each other in a first direction (the horizontal direction of a screen, that is, the x direction in the drawing) and extend in a second direction intersecting with the first direction (the vertical direction of the screen, that is, the y direction in the drawing). The second electrode 24 includes a plurality of electrode parts 240 which are spaced apart from each other in the second direction and extend in the first direction.

This embodiment illustrates the touch panel 100 which includes a first conductive film 10 including the first electrode 14 formed therein and a second conductive film 20 including the second electrode 24 formed therein. In this regard, the touch panel 100 is constituted by the first conductive film 10, the second conductive film 20, and a cover substrate 30 bonded to the first and second conductive films 10 and 20 by means of first and second transparent adhesive layers 42 and 44. This construction will now be described in more detail.

The cover substrate 30 may be constituted by a substrate, a film, a sheet and the like made of a material serving to protect the touch panel 100 from external shock and to allow light to be transmitted through the touch panel 100. By way of example, the cover substrate 30 may include glass and the like. However, the present invention is not limited thereto, and the material of the cover substrate 30 may be substituted with various materials.

The first transparent adhesive layer 42 is disposed between the cover substrate 30 and the first conductive film 10 to bond them to each other, and the second transparent adhesive layer 44 is disposed between the first conductive film 10 and the second conductive film 20 to bond them to each other. By virtue of the first and second transparent adhesive layers 42 and 44, a plurality of layers constituting the touch panel 100 may be integrally combined with each other. The first and second conductive films 10 and 20 with the first and second flexible printed circuit boards 19 and 29 attached thereto may be bonded to the first and/or second transparent adhesive layers 42 and 44.

The first and second transparent adhesive layers 42 and 44 may be made of a material having adhesivity capable of bonding layers disposed on opposite sides thereof, i.e., an optically clear adhesive material (OCA). The optically clear adhesive material is excellent in adhesivity, humidity resistance, heat resisting foamability and workability, and can prevent deterioration of the first and/or second electrodes 14 and 24. Various materials known as optically clear adhesive material may be used as the first and second transparent adhesive layers 42 and 44.

The first and second conductive films 10 and 20 are disposed on the cover substrate 30 (on the lower surface of the cover substrate 30 in the drawing). Although this embodiment illustrates an exemplary construction in which the first electrode 14 is formed on the first base member 12 to constitute the first conductive film 10 and the second electrode 24 is formed on the second base member 22 to constitute the second conductive film 20, the present invention is not limited thereto and various modifications may be provided. Accordingly, the first electrode 14 and the second electrode 24 may be formed on the same base member, and the positions, layered structure and materials of the first and second electrodes 24 may be changed.

The first conductive film 10 includes the first base member 12, the first electrode 14 formed on the base member 12, and the first overcoating layer 16 covering the first electrode 14 in at least the effective region AA.

The first base member 12 may be a film, a sheet, a substrate and the like made of a material capable of maintaining the mechanical strength of the first conductive film 10 and having translucency and insulation properties. The first base member 12 may include at least one of polyethylene, polypropylene, polyethylene terephthalate, polyethylene-2,6-naphthalate, polypropylene terephthalate, polyimide, polyamide imide, polyether sulfone, polyether ether ketone, polycarbonate, polyarylate, cellulose propionate, polyvinyl chloride, polyvinylidene chloride, polyvinyl alcohol, polyetherimide, polyphenylene sulfide, polyphenylene oxide and polystyrene. By way of example, the first base member 12 may be made of polyether terephthalate. However, the present invention is not limited thereto, and various materials other than the above-mentioned materials may be used as the first base member 12.

The first electrode 14 formed on the first base member 12 includes the plurality of electrode parts 140 described above. Each of the plurality of electrode parts 140 of the first electrode 14 includes the first sensor electrode part 142 disposed in the effective region AA, along with the first wiring part 144 extending from the first sensor electrode part 142 and disposed in at least the non-effective region NA. The first sensor electrode part 142 may include a plurality of first sensor portions 142a having a relatively larger width or area to substantially detect touch, and first connecting portions 142b disposed between adjacent first sensor portions 142a to connect the adjacent first sensor portions 142a to each other.

In this embodiment, the first sensor portions 142a are the portions for substantially detecting whether an input device such as a user finger is in contact therewith. The first sensor portions 142a shown in the drawings have a rhombic shape and are formed in conjunction with the second sensor portions 242a in a wide area of the effective region AA to efficiently detect touch. However, the present invention is not limited thereto, and the first sensor portions 142a may have various shapes such as a polygonal shape exemplified by a triangular shape and a rectangular shape, a circular shape or an elliptical shape. The first connecting portions 142b connect the plurality of first sensor portions 142a to each other in the second direction (the vertical direction of the screen, that is, the y direction in the drawing). Consequently, the first sensor electrode parts 142 may be disposed to be elongated in the effective region AA in the second direction.

In this embodiment, the first sensor electrode part 142 includes a transparent conductive material having conductivity and translucency. By way of example, the first sensor electrode part 142 may include a nanomaterial conductor 14a having a network structure (for example, a metal nanowire such as a silver nanowire, a copper nanowire and a platinum nanowire). The term "network structure" used herein may refer to a structure in which adjacent nanomaterial conductors such as wires are netted to constitute a net structure or a mesh structure having contact points therebetween, thus making electrical connection through the contact points.

When the first sensor electrode part 142 includes the nanomaterial conductors 14a made of a transparent conductive material, the first sensor electrode part 142 may be formed through a wet coating process which is less expensive than a deposition process. Specifically, the first sensor electrode part 142 may be formed in such a way that an electrode layer is formed by a wet coating process of applying a paste, ink, mixture or liquid including a nanomaterial conductors constituted by nanowires or the like, and is then patterned. In this case, the nanomaterial conductors 14a contained in the liquid, mixture or paste used in the wet coating process have a very low concentration (for example, 1% or less). Therefore, the costs required for the formation of the first sensor electrode part 142 can be reduced, thus improving conductivity.

When the first sensor electrode part 142 includes the nanomaterial conductors 14a, the first sensor electrode part 142 has translucency, lower resistance and excellent electrical properties. For example, a surface of a silver nanoparticle has various crystal faces, and thus anisotropic growth may be easily caused, thus enabling easy production of silver nanowires. Since a silver nanowire has a resistance of about $10\Omega/\square$ to $400\Omega/\square$, a low resistance (for example, $10\Omega/\square$ to $150\Omega/\square$) may be realized. Consequently, the first sensor electrode part 142 may be formed to have a predetermined resistance within a wide range. Particularly, the first sensor electrode part 142 having better electrical conductivity than indium tin oxide, which has a resistance of about $10\Omega/\square$ to $400\Omega/\square$, may be formed. Furthermore, the silver nanowire has a more excellent transmittance than indium tin oxide, and may have, for example, a transmittance of 90% or higher. In addition, since the silver nanowire is flexible, it may also be applied to flexible devices and the supply of material may be reliable.

By way of example, the nanowire as described above may have a radius of 10 nm to 60 nm and a major axis of 10 μm to 200 μm. Since the nanowire has an excellent aspect ratio (for example, 1:300 to 1:20000) in the above range, a network structure may be reliably formed and it is possible to enable the first sensor electrode part 143 to be scarcely visible. However, the present invention is not limited thereto, and the radius, major axis and aspect ratio of the nanowire may be variously changed.

In this embodiment, since the first sensor electrode part 142 includes the nanomaterial conductors 14a constituting a network structure, it is possible to reduce the material cost and to improve various properties.

The sensor electrode part 142, which is constituted by a conductive layer including the nanomaterial conductors 14a constituting the network structure, may be constructed such that the nanomaterial conductors 14a are disposed in a layer having a uniform thickness, or such that a cavity is formed between the nanomaterial conductors 14a. In practice, the first sensor electrode part 142 is formed by applying mixture in which the nanomaterial conductors 14a are mixed with a very small amount of solvent, binder or the like. Consequently, the first sensor electrode part 14 may be configured such that a residual portion 14b which is formed by the remaining solvent, binder or the like has a relatively smaller first thickness (T1), and the conductors 14a extend to the outside from the residual portion 14b. Consequently, the network structure constituted by the conductors 14a may have a relatively greater second thickness (T2). In the following description, the thickness of the first sensor electrode part 142 means not the first thickness (T1) of the residual portion 14b but the total thickness of the residual portion 14b and the conductor protruding upward from the residual portion 14b, that is, the second thickness (T2).

The thickness of the first sensor electrode 142 may be variously changed in accordance with the size of the touch panel 100, the required resistance and the material of the first sensor electrode part 142. If the first sensor electrode part 142 includes metal nanowires constituting a network structure, the first sensor electrode part 142 may have a minimized thickness, for example, a thickness of 50 nm to 350 nm. Such a minimized thickness enables the first sensor electrode part 142 to be easily formed. However, the present invention is not limited thereto, and the thickness of the first sensor electrode part 142 may have various values.

The first overcoating layer 16, covering the first base member 12 and the first sensor electrode part 142 formed on the first base member 12, has physical and chemical properties such that it serves to protect the first sensor electrode part 142. More specifically, the first overcoating layer 16 may entirely cover the outer surfaces of the conductors 14a protruding from the residual portion 14b in order to prevent breakage or oxidation of the conductors 14a. More specifically, it is possible to prevent physical breakage of the conductors 14a such as breakage of the conductors 14a, protruding from the residual portion 14b due to the application of external force. Furthermore, since electrical conductivity of the conductors 14a may be deteriorated if they are exposed to atmospheric conditions for a long period of time, the first overcoating layer 16 is provided to cover the conductors 14a so as to prevent the deterioration of electrical conductivity. In this embodiment, since the first sensor electrode part 142 includes the nanomaterial conductors 14a constituting a network structure, the first overcoating layer 16 is formed in order to ensure an improvement in the physical stability of the conductors 14a and to prevent oxidation. By way of example, the first overcoating layer 16 may partially infiltrate the conductors 14a and fill voids defined between the conductors 14a, and the remaining portion of the first overcoating layer 16 may be formed upward from the conductors 14a. Unlike this embodiment, even if the conductors 14a are disposed in the residual portion 14b without protruding upward from the residual portion 14b, the first overcoating layer 16 may prevent the conductors 14a from being oxidized due to atmospheric air penetrating the residual portion 14b. To this end, the first overcoating layer 16 may be configured to directly contact the first sensor electrode part 142 or the conductors 14a.

The first overcoating layer 16 may be formed to entirely cover the first base member 12 including the first sensor electrode part 142. In this regard, the phrase "the first overcoating layer 16 is formed to entirely cover" may include the case in which the first overcoating layer is inevitably not formed over a partial area as well as the case in which the first overcoating layer is completely formed without a gap.

The first overcoating layer 16 may be made of resin. By way of example, although the first overcoating layer 16 may be made of acrylic resin, the present invention is not limited thereto, and the first overcoating layer 16s may include other materials. The first overcoating layer 16 may be formed to entirely cover the first sensor electrode part 142 through various coating processes.

By way of example, the first overcoating layer 16 may have a thickness of 50 nm to 200 nm. If the first overcoating layer 16 has a thickness less than 50 nm, the effect of preventing oxidation of the conductors 14a may not be sufficiently achieved. Meanwhile, if the first overcoating layer 16 has a thickness greater than 200 nm, material cost may be increased. However, the present invention is not limited thereto, and the first overcoating layer 16 may have various thicknesses.

Although this embodiment shown in the drawings illustrates the case in which the residual portion 14b of the first sensor electrode part 142 and the first overcoating layer 16 are constituted by different layers, the present invention is not limited thereto. In another embodiment, the conductors 14a may be disposed in the single first overcoating layer 16 by applying ink and the like in which materials constituting the conductors 14a and the residual portion 14b of the first sensor electrode part 142 and the first overcoating layer 16 are mixed with each other. It will be understood that various modifications are possible.

The first wiring part 144 is disposed at at least the non-effective regions NA. The first wiring part 144 may be elongated so as to be connected to the first flexible printed circuit board 19.

In this embodiment, the first wiring part 144 may be disposed on the first overcoating layer 16. The first wiring part 144 and the first sensor electrode part 142 may be layered with the first overcoating layer 16 disposed therebetween in order to electrically connect the first wiring part 144 to the first sensor electrode part 142. Alternatively, the first overcoating layer 16 disposed between the first wiring part 144 and the first sensor electrode part 142 may also be completely or partially removed such that the first wiring part 144 contacts the first sensor electrode part 143, thus providing an electrical connection therebetween. However, the present invention is not limited thereto, and the first wiring part 144 and the first sensor electrode part 142 may be disposed on the same plane to ensure direct contact. Furthermore, various other modifications are possible.

The first wiring part 144 may be made of a metal material having excellent conductivity. Therefore, even if the first wiring part 144 has a small width, the first wiring part 144 may have satisfactory electrical properties because it has a low resistance. The first wiring part 144 may be formed through various processes. By way of example, the first wiring part 144 may be formed in such a way as to apply conductive paste through various coating processes and then to heat-treat or bake the conductive paste, thus curing the conductive paste. The first wiring part 144 may be made of a metal material so as to provide excellent electrical conductivity. For example, the first wiring part 144 may be made of conductive paste including conductive powders such as silver (Ag).

However, the present invention is not limited thereto, and the first wiring part 144 may have various shapes, and may include conductive materials. For example, although this embodiment illustrates the case in which the first sensor electrode part 142 and the first wiring part 144 include different materials, the first wiring part 144 and the first sensor electrode part 142 may be made of the same material, and thus may be integrally constructed. In this case, the first wiring part 144 may include the nanomaterial conductors 14a made of the same material as the first sensor electrode part 142. Consequently, it is possible to simplify the process of forming the first sensor electrode part 142 and the first wiring part 144. In this case, the first wiring part 144 is not disposed on the first overcoating layer 16. In other words, the first sensor electrode part 142 and the first wiring part 144 may be formed in the same plane as the first base member 12, and the first overcoating layer 16 may be formed to cover all of the first sensor electrode part 142 and the first wiring part 144.

The first wiring part 144 may be connected to the first flexible printed circuit board 19 for connection to the outside. The first flexible printed circuit board 19 may include a base member, along with a wiring part formed on the base member. The first wiring part 144 and the first flexible printed circuit board may be electrically connected to each other by causing the wiring part of the first flexible printed circuit board 19 to contact the first wiring part 144. However, the present invention is not limited thereto, and the wiring part of the first flexible printed circuit board 19 and the first wiring part 144 may also be electrically connected to each other by disposing therebetween a conductive adhesive member (not shown) such as anisotropic conductive adhesive (ACA), anisotropic conductive past (ACP) or anisotropic conductive film (ACF).

The drawings illustrate the first wiring part 144 constituting a single routing structure. Consequently, the first wiring part 144 is formed in the non-effective region NA positioned below the effective regions AA. However, the present invention is not limited thereto, and the first wiring part 144 may be disposed at any of above and below the effective region AA and on right and left sides of the effective region AA. In addition, various other modifications are possible.

The second conductive film 20 may include a second base member 22, a second electrode 24 formed on the second base member 22, and a second overcoating layer 26 covering the second electrode 24 at at least the effective region AA. The second electrode 24 may include a second sensor electrode part 242 disposed in the effective region AA, and a second wiring part 244 electrically connected to the second sensor electrode part 242 in the non-effective region NA.

Since the description of the first base member 12 may be substantially applied to the second base member 22, a detailed description of the second base member 22 is omitted.

The second electrode 24 formed on the second base member 22 includes the plurality of electrode parts 240 as described above. Each of the plurality of electrode parts 240 includes the second sensor electrode part 242 disposed in the effective region AA, along with the second wiring part 244 extending from the second sensor electrode part 242 and disposed in at least the non-effective region NA. The second sensor electrode part 242 may include a plurality of second sensor portions 242*a*, having a relatively larger width or area to substantially detect touch, and second connecting portions 242*b* disposed between adjacent second sensor portions 242*a* to connect the adjacent second sensor portions 242*a* to each other.

The second connecting portions 242*b* connect the plurality of second sensor portions 242*a* to each other in the first direction (the horizontal direction of the screen, that is, the x direction in the drawing). Consequently, the second sensor electrodes 242 are arranged in the effective region AA in the first direction. Other than the extension direction of the second sensor electrode part 242, the description of the first sensor electrode part 142 may be substantially applied to the second sensor electrode part 242. However, the present invention is not limited thereto. The first electrode 42 and the second electrode may be made of different materials, and may be made of materials other than the nanomaterial conductors 14*a*.

The second wiring part 244 is disposed in the non-effective region NA. The second wiring part 244 may be elongated to be connected to the second flexible printed circuit board 29.

The drawings illustrate a double routing structure in which the second wiring part 244 is disposed at opposite ends of the second sensor electrode part 242. The double routing structure serves to lower the resistance of the second sensor electrode part 242 so as to prevent loss due to resistance because the second sensor electrode part 242 is relatively long. However, the present invention is not limited thereto, and it may be modified into various structures such as a single routing structure in which the second wiring part 244 is connected to only one side of the second sensor electrode part 242.

Furthermore, the drawings illustrate a configuration in which the second wiring part 244 is connected to the outside through two non-effective regions NA disposed at opposite sides of the effective region AA. However, the present invention is not limited thereto. The second wiring part 244 may be connected to the outside through a single non-effective region NA disposed at one side of the effective region AA, or may extend upward or downward from the effective region AA and may then be connected to the outside. In addition, various other modifications are possible.

With this exception, since the description of the first wiring part 144 and the first flexible printed circuit board 19 may be substantially applied to the second wiring part 244 and the second flexible printed circuit board 29, a detailed description thereof is omitted.

In this embodiment, in order to enable the touch panel 100 having a curved surface to have uniform touch sensitivity throughout the area, the resistances of the plurality of electrode part 140 of the first electrode 14, the resistances of the plurality of electrode parts 240 of the second electrode 24, or the resistances of the plurality of electrode parts 140 of the first electrode 14 and the plurality of electrode parts 240 of the second electrode 24 are set to be different from one another.

More specifically, if the touch panel 100 has a flat surface having a large area, the flat surface may be considered to be the main image surface (MIS). Alternatively, a flat surface defined between the apexes of the touch panel 100 may also be considered to be the main image surface (MIS). When a touch device (finger, stylus touch pen or the like) touches a portion of the touch panel 100 parallel to the main image surface (MIS), the touch occurs at a sufficiently large touch area. Meanwhile, when a touch device touches a portion of the touch panel 100 defining a large angle with respect to the main image surface (MIS), the touch occurs at a relatively smaller touch area.

Upon touching, the touch device is typically disposed in a direction parallel to or slightly inclined with respect to the second direction (the vertical direction of the screen, that is, the y direction in the drawing) of the main image surface (MIS). At this point, when there is a curvature in the second direction and the same touch device is used, the contact area or the angle between the touch device and the main image surface (MIS) may vary depending on the vertical position. Accordingly, when there is a curvature in the second direction, the angle defined between the main image surface (MIS) and the touch surface of the touch panel 100 and the vertical position of the touch surface may also affect the touch area. A specific description regarding this will be given later with reference to FIGS. 9 to 11. Meanwhile, when there is a curvature in the first direction (the horizontal direction of the screen, that is, the x direction in the drawing), the angle defined between the main image surface (MIS) and the touch device dominantly affects a touch area because the touch angle defined between the main image surface (MIS) and the touch device is not substantially affected by the kind of touch device. Therefore, when there is a curvature only in the first direction, the resistances, areas and the like of the plurality of electrode parts 140 of the first electrode 14 which are spaced apart from each other in the first direction and extend in the second direction, may be set differently from each other in consideration only of the angle defined between the main image surface (MIS) and the touch device.

In this embodiment, the touch panel 100 in a curved state has a first section P11, in which a first angle A1 is defined with respect to the main image surface (MIS), and a second section P12, in which a second angle A2 greater than the first angle A1 is defined with respect to the main image surface (MIS). At this point, even if the same touch device is used, the touch area in the second section P12 is smaller than that in the first section P11 in the case where the touch panel 100 has a curved state. The first angle A1 may mean an acute angle defined between the main image surface (MIS) and the first section P11, and the second angle A2 may mean an acute angle defined between the main image surface (MIS) and the second section P12.

By way of example, the touch panel 100 in a curved state is curved to have a curvature in the horizontal direction of the screen (the first direction, that is, the x direction in the drawing). More specifically, the touch panel 100 is curved such thin the opposite lateral side regions in the first direction protrude forward more than the central portion and the opposite lateral side regions of the touch panel 100 in the first direction are symmetrically positioned. At this point, the first section P11 may be the central portion in the first direction, and the second section P12 may be a lateral side portion in the first direction. The second section P12 may be positioned at both sides of the first section P11, and the second section P12 may be symmetrically positioned with respect to the first section P11 disposed therebetween.

Since the first section P11 defines the relatively small first angle A1 between the main image surface (MIS) and the touch device having the curvature in the first direction, the touch area is relatively increased when the same touch device is used. Meanwhile, since the second section P12 defines the relatively large second angle A2 between the main image surface (MIS) and the touch device having the curvature in the first direction, the touch area is relatively decreased when the same touch device is used. Therefore, if the electrode parts 140 of the first electrode 14 extending through the first section P11 and the second section P12 are configured to be identical to each other, the second section P12 may offer a smaller touch area, thus reducing touch accuracy.

Figure 4:
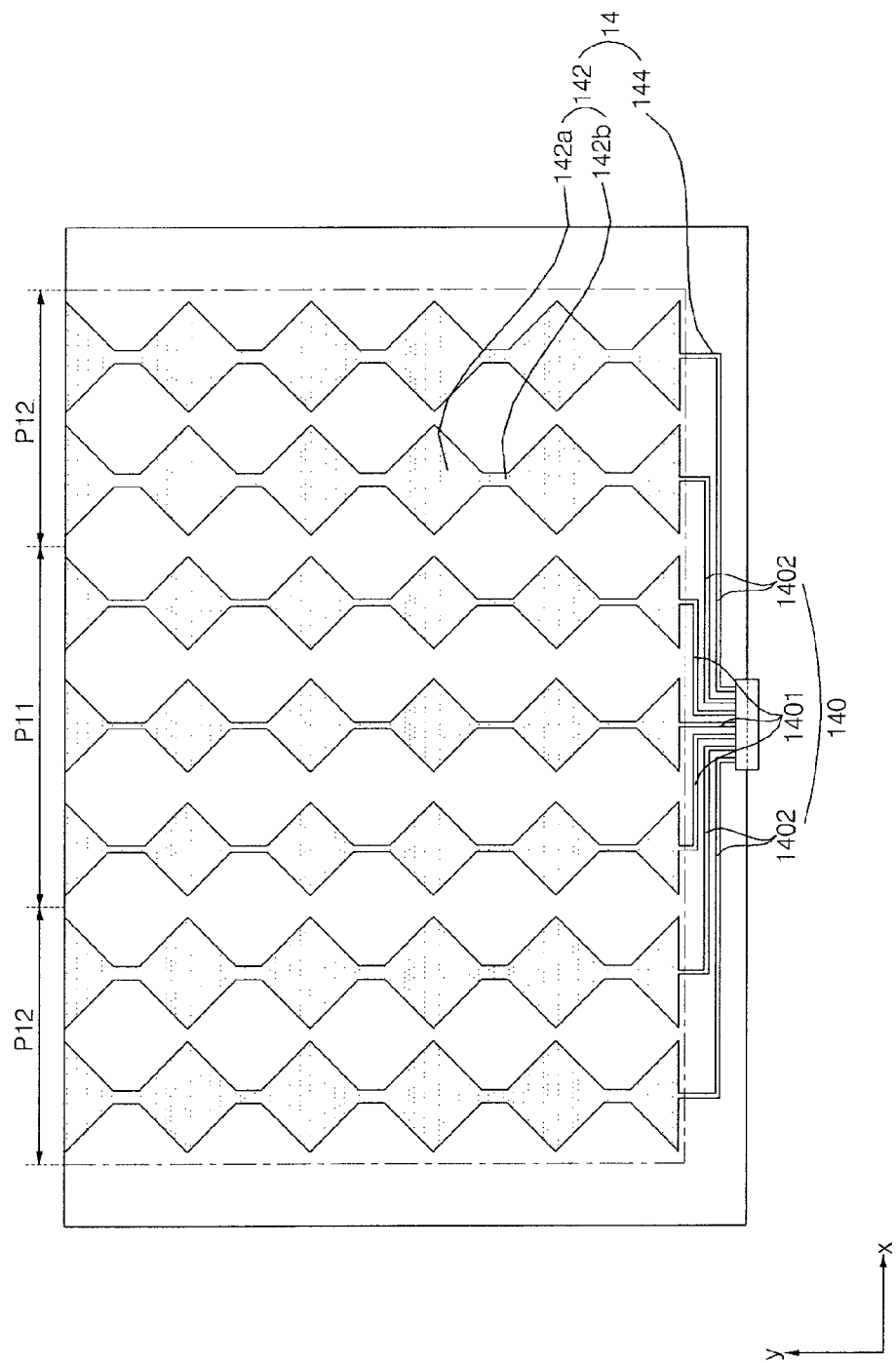
FIG. 4 is a plan view showing the first electrode of the touch panel shown in FIG. 1.

In consideration of this problem, this embodiment improves the configuration of the plurality of electrode parts 140 of the first electrode 14. The configuration of the plurality of electrode parts 140 of the first electrode 14 is now described in detail with reference to FIG. 4. FIG. 4 is a plan view showing the first electrode 14 of the touch panel 100 shown in FIG. 1.

Referring to FIG. 4, in this embodiment, the plurality of electrode parts 140, which are spaced apart from each other in the first direction, include first electrode parts 1401 disposed in the first section P11, which is positioned in the center region in the first direction, and second electrode parts 1402, extending through lateral side regions in the first direction. Each first electrode part 1401 includes the first sensor electrode part 142, which is disposed in the effective region AA and including the first sensor portions 142a and the first connecting portions 142b, and a first wiring part 144 disposed in the non-effective region NA and is connected to the first sensor part 142. Similarly to the first electrode part 1401, each second electrode part 1402 includes the first sensor electrode part 142, which is disposed in the effective region AA and includes the first sensor portions 142a and the first connecting portions 142b, and the first wiring part 144, which is disposed in the non-effective region NA and is connected to the first sensor electrode part 142.

In this construction, the first electrode part 1401, which is disposed in the first section P11, has a lower resistance than the second electrode part 1402, which is disposed in the second section P12. In order to make the resistances of the first and second electrode parts 1401 and 1402 different from each other, various technologies may be applied. In this embodiment, the volumes (for example, surface areas) of the first sensor electrode parts 142 of the plurality of electrode parts 140 disposed in the effective region AA may be set differently from each other. Specifically, the second electrode part 1402, disposed in the second section P12, may have a larger volume (for example, surface area) than the first electrode part 1401, disposed in the first section P11, so as to cause the resistance of the second electrode part 1402, disposed in the second section P12, to be smaller than that of the first electrode part 1401, disposed in the first section P11.

The first sensor portion 142a of the second electrode part 1402 may have a larger surface area than that of the first sensor portion 142a of the first electrode part 1401. In addition, the first connecting portion 142b of the second electrode part 1402 may be wider than the first connecting portion 142b of the first electrode part 1401.

Since the first sensor electrode parts 142 of the first electrode parts 1401 and the first sensor electrode parts 142 of the second electrode parts 1402 are generally formed in the same process, it is possible to easily control the volume of the first sensor electrode part 142 by changing the surface area rather than the thickness of the first sensor electrode part 142. Accordingly, this embodiment changes the surface area of the first sensor portion 142a and the width of the first connecting portion 142b. However, the present invention is not limited thereto, and the thicknesses of the first sensor electrode parts 142 of the first and second electrode parts 1401 and 1402 may be set differently from each other. Furthermore, the shapes, surface areas or widths of the first sensor portion 142a or the first connecting portion 142b may be set such that they are different from each other.

As described above, since the second sections P12 are positioned to occupy opposite lateral side regions, with the first section P11 disposed therebetween in the first direction, the second electrode parts 1402 may be disposed to occupy opposite lateral side regions of the touch panel 100 in the first direction. FIG. 4 illustrates an example in which the touch panel 100 is constituted by the first section P11 occupying the central region in the first direction, and the two second sections P12, positioned respectively on either lateral side of the first section P11. In this case, the plurality of first electrode parts 1401 disposed in the first section P11 may have a uniform surface area, and the plurality of second electrode parts 1402 disposed in the second sections P12 may have a surface area that is uniform but larger than that of the plurality of first electrode parts 1401. Although the drawing illustrates an example in which the first section P11 is provided with three first electrode parts 1401 and each second section P12 is provided with two second electrode parts 1402, the present invention is not limited as to the numbers of the first electrode parts 1401 or the second electrode parts 1402.

Figure 5:
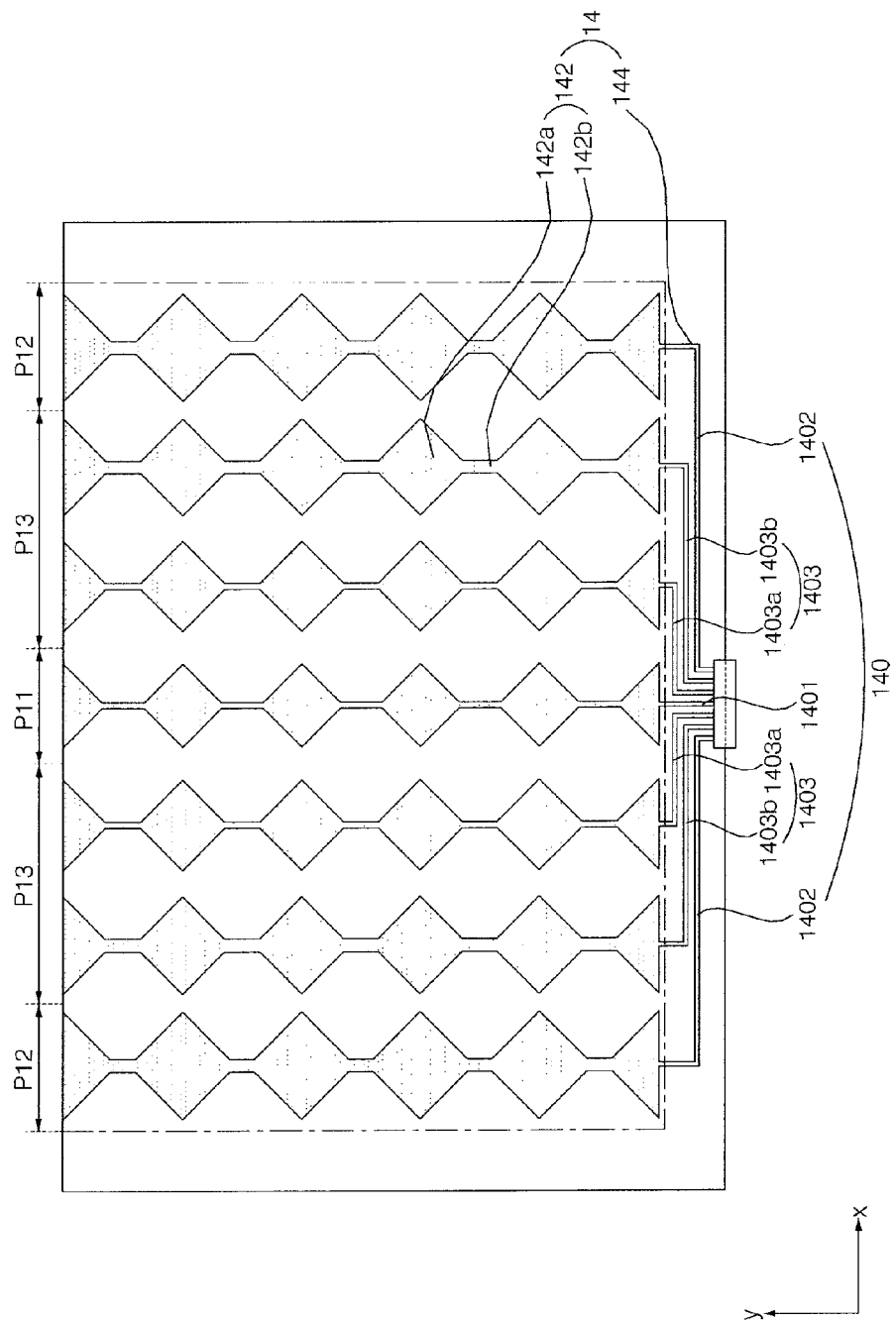
FIG. 5 is a plan view showing another example of the first electrode of the touch panel shown in FIG. 1.

Furthermore, although FIG. 4 illustrates an example in which the touch panel 100 is composed of the first section P11 and the second sections P12, the present invention is not limited thereto. For example, as shown in FIG. 5, third sections P13 may be positioned between the first section P11, positioned in the central region in the first direction and the second sections P12, positioned in opposite lateral side regions in the first direction. In this case, among third electrode parts 1403, a third electrode part 1403a adjacent to the first electrode part 1401 disposed in the first section P11 has a smaller resistance and a larger volume (for example, surface area) than dose the first electrode part 1401. The third electrode parts 1403 may be configured to have resistances which are decreased in stages and volumes (for example, surface areas) which increase in stages when moving toward the third electrode part 1403b, adjacent to the second electrode part 1402 disposed in the second section P12, from the third electrode part 1403a adjacent to the first electrode part 1401. In addition, the third electrode part 1403b adjacent to the second electrode part 142 disposed in the second section P12 may have a higher resistance and a smaller volume (for example, surface area) than the second electrode part 1402. Consequently, the plurality of electrode parts 140 may have resistances which are decreased in stages and volumes or surface areas which are increased in stages when moving toward the second electrode parts 1402, disposed in the second section P12 from the first electrode part 1401, disposed in the first section P11 through the third section P13.

As described above, when the second electrode part 1402 disposed in the second section P12 is configured to have a relatively larger volume or surface area and thus a relatively lower resistance, it is possible to compensate for the reduction in touch accuracy in the second section P12 in which the size of the touch area is relatively reduced.

Figure 7:
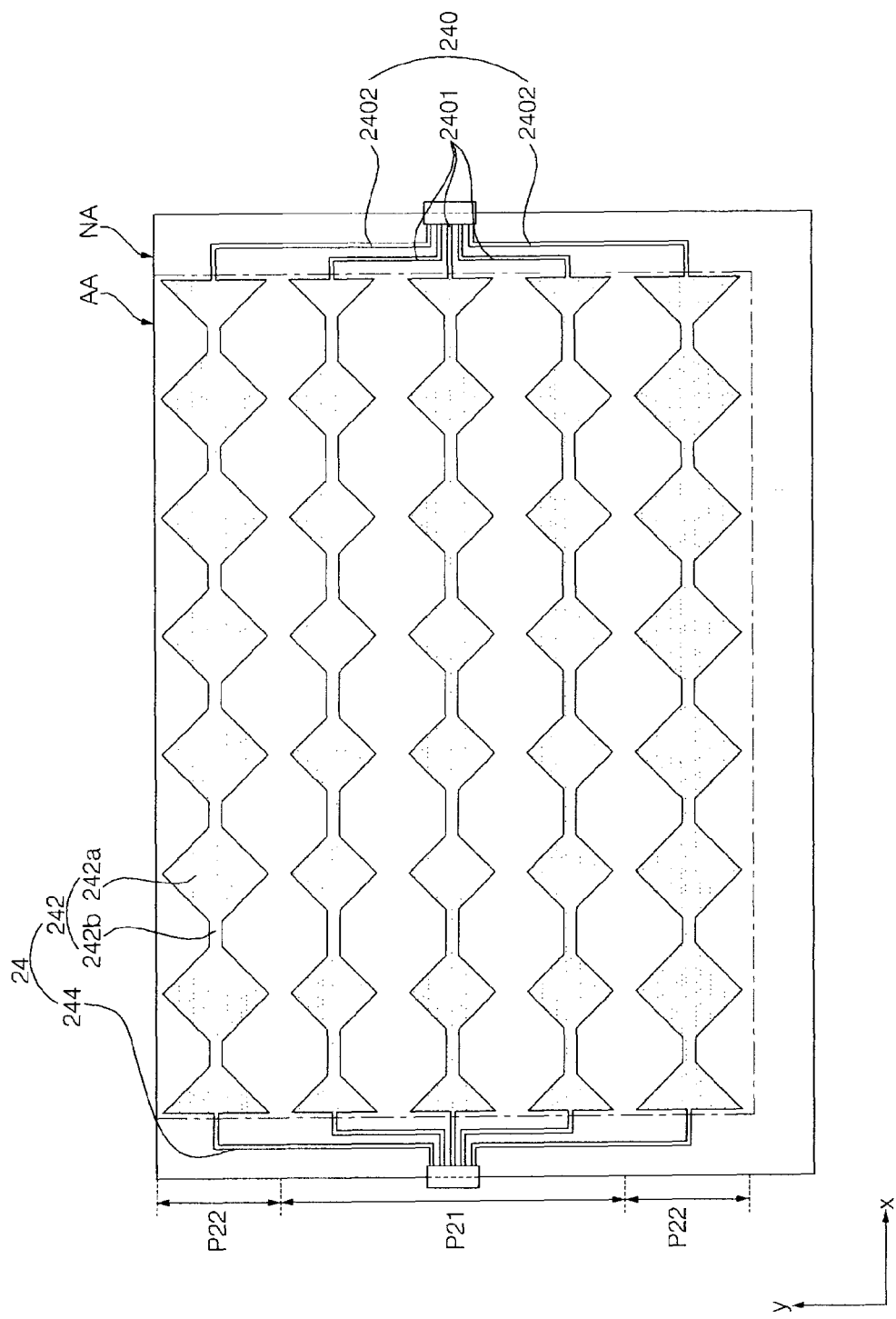
FIG. 7 is a plan view showing an example of the second electrode of the touch panel of FIG. 6.
Figure 8:
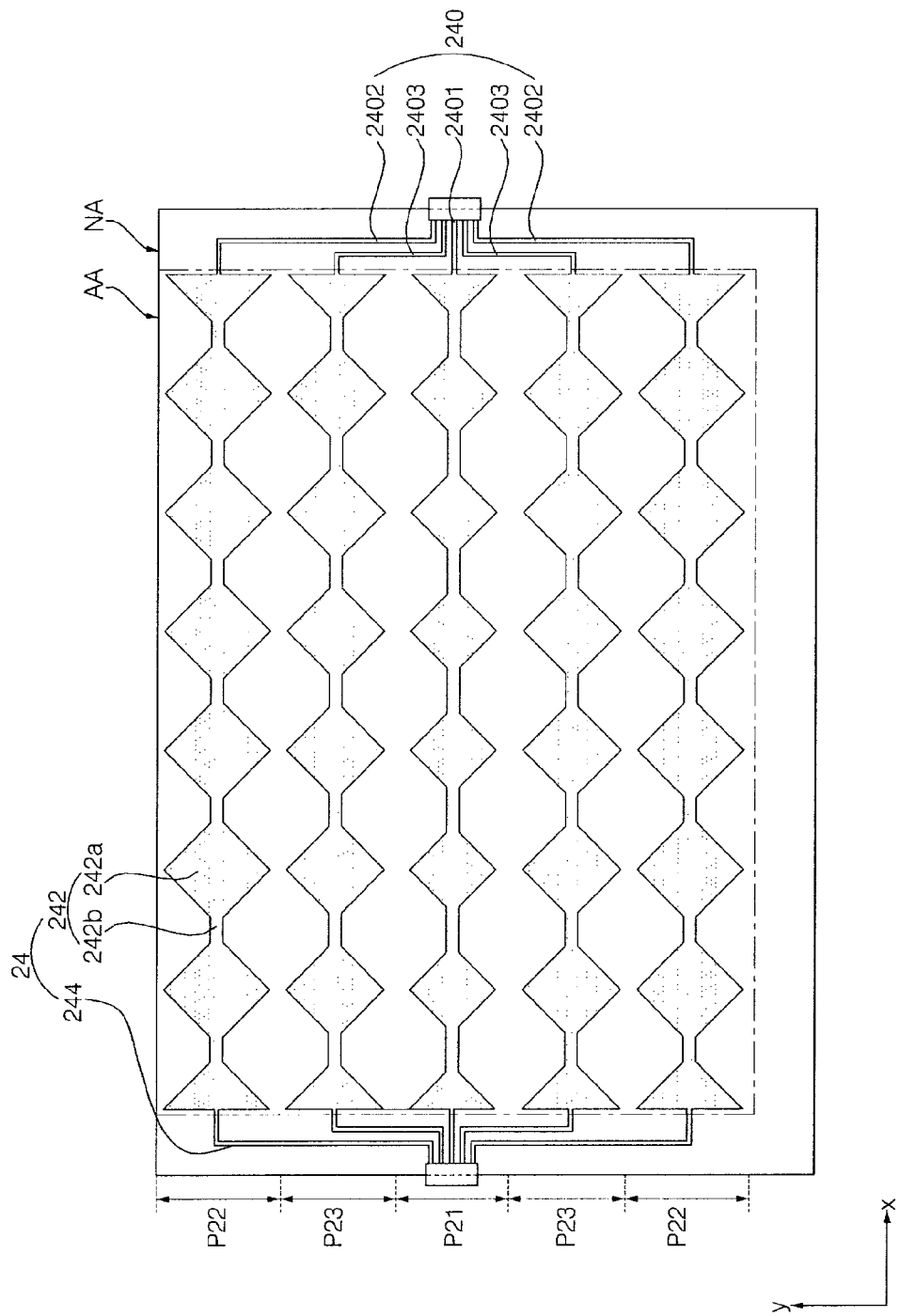
FIG. 8 is a plan view showing another example of the second electrode of the touch panel shown in FIG. 6.
Figure 11:
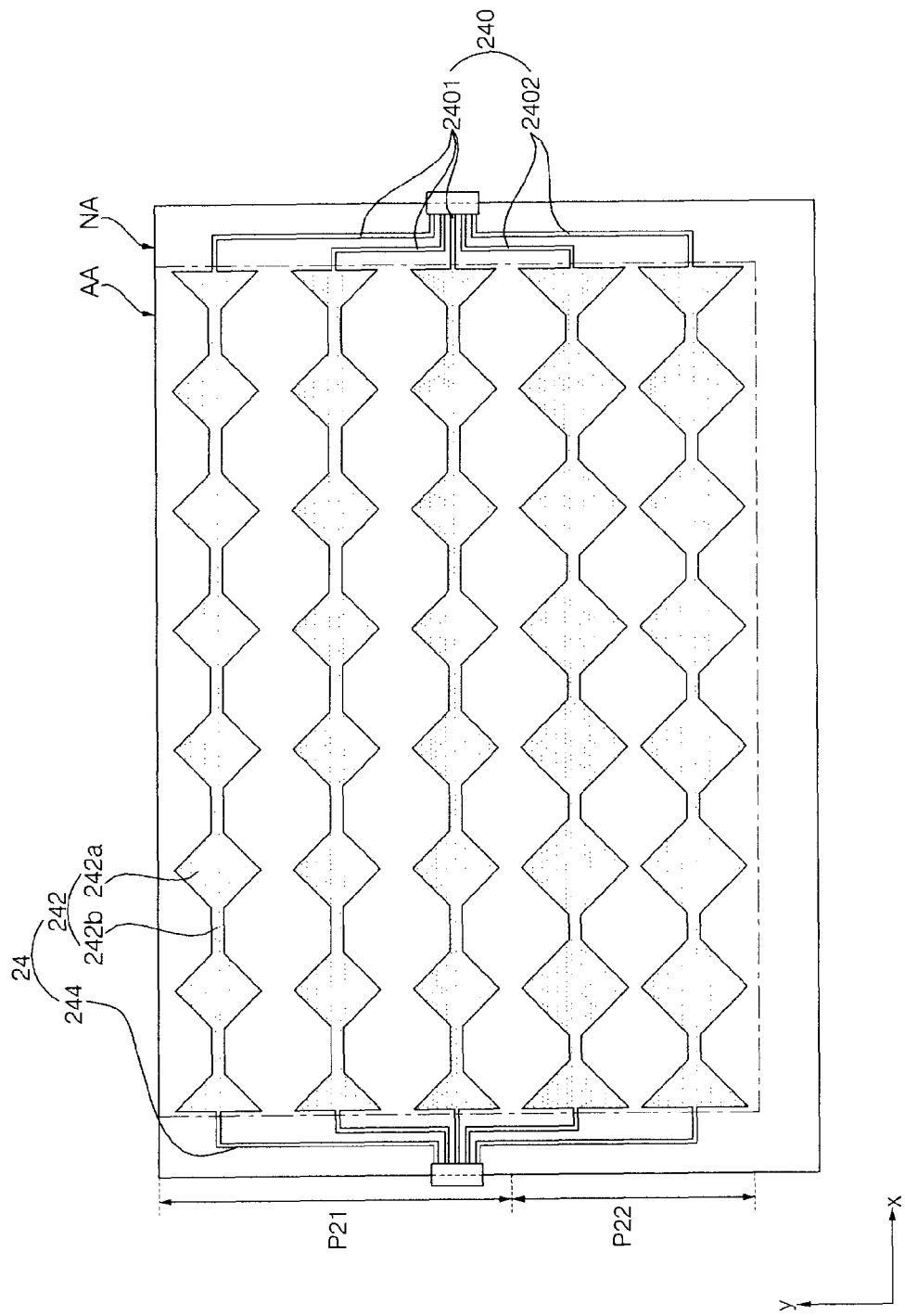
FIG. 11 is a plan view showing an example of the second electrode of the touch panel shown in FIG. 9.

Referring again to FIGS. 1 to 4, since the touch panel 100 does not have a curvature in the second direction (the vertical direction, that is, the y direction in the drawing), the plurality of electrode parts 240, which constitute the second electrode 24 and are spaced apart from each other in the second direction, may be configured to have uniform resistance and surface area. In other words, in the plurality of electrode parts 240 of the second electrode 24, second sensor portions 240a and second connecting portions 240b of the second sensor electrode parts and the second wiring part 244 may have respective uniform surface areas or widths. However, the present invention is not limited thereto. For example, as shown in FIG. 7, 8 or 11, even though there is no curvature in the second direction, second electrode parts 2402 disposed in a second section P22 occupying upper and lower side regions in the second direction may have a lower resistance than that of first electrode parts 2401 disposed in a first section P21 occupying the central region in the second direction. Consequently, it is possible to prevent reduction of touch sensitivity in upper and lower side regions, which are difficult for a touch device to reach, in the second direction in the case of a large-scale touch panel 110.

As described above, the touch panel according to this embodiment is configured to be curved such that the second electrode part 1402, disposed in the second section P12 in which the touch area is reduced has a larger volume or surface area and a lower resistance than the first electrode part 1401, disposed in the first section P11, in which the touch area is increased. Accordingly, the second section P2, in which the touch area is reduced, provides a sufficient touch area, thus ensuring an improvement in touch sensitivity and uniform touch sensitivity in a curved state.

Hereinafter, a touch panel and a display device including the same according to another embodiment of the present invention will be described in detail with reference to the accompanying drawings. Since the above description may be applied to elements identical or similar to the first embodiment, a detailed description of those elements will be omitted, and only the elements that differ will be described in detail. It will be understood that the above embodiment, various modifications thereof, the following embodiments and combinations thereof also fall within the true spirit and scope of the invention.

FIG. 6 is a perspective view schematically showing a display device including a touch panel having a curved surface according to another embodiment of the present invention. FIG. 7 is a plan view showing an example of the second electrode of the touch panel of FIG. 6.

Referring to FIG. 6, the display device 300 according to this embodiment has curvatures both in the first direction (the horizontal direction of the screen, that is, the x direction in the drawing) and in the second direction (the vertical direction of the screen, that is, the y direction in the drawing). The display device 300 may have curvatures both in the first and second directions to improve viewer immersion and the touch panel 100 may also have curvatures both in the first and second directions as in the display panel 200.

In this embodiment, since a first electrode (14 in FIG. 2) of the touch panel 100 has the configuration as shown in FIG. 4 or 5, detailed description thereof will be omitted.

In this embodiment, the touch panel 100 is curved to have a curvature in the second direction (the horizontal direction of the screen, that is, the y direction in the drawing) in a curved state. More specifically, the touch panel 100 is curved such thin the opposite lateral side regions in the second direction protrude forward more than the central portion and the opposite lateral side regions of the touch panel 100 in the second direction are symmetrically positioned. At this point, the first section P21 may be the central portion in the second direction, and the second sections P22 may be opposite lateral side portions in the second direction. The second section P22 may be positioned on both sides of the first section P21, and the second section P22 may be symmetrically positioned with respect to the first section P21 disposed therebetween.

Since the first section P21 defines the relatively smaller angle between the main image surface (MIS) and the touch device in the second direction having the curvature, the size of the touch area is relatively increased when the same touch device is used. Meanwhile, since the second section P22 defines a relatively greater angle between the main image surface (MIS) and the touch device in the second direction having the curvature, the size of the touch area is relatively decreased when the same touch device is used.

As shown in FIG. 7, the plurality of electrode parts 240 according to this embodiment includes the first electrode parts 2401 disposed in the first section P21 positioned in the central region in the second direction, and the second electrode parts 2402m extending through lateral side regions in the second direction. Each of the first electrode parts 2401 includes the second sensor electrode parts 242, which are disposed in the effective region AA and include the second sensor portions 242a and the second connecting portions 242b, and the second wiring parts 244, which are disposed in the non-effective region NA and are connected to the second sensor electrode parts 242. Similarly to the first electrode part 2401, each second electrode part 2402 includes the first sensor electrode parts 242 disposed in the effective region AA and including the first sensor portions 242a and the first connecting portions 242b, and the first wiring parts 244, disposed in the non-effective region NA and connected to the first sensor electrode part 242.

The second sensor portion 242a of the second electrode part 2402 may have a larger surface area than the second sensor portion 242a of the second electrode part 2401. In addition, the second connecting portion 242b of the second electrode part 2402 may have a larger width than the second connecting portion 242b of the second electrode part 2401.

Since the second sensor electrode parts 242 of the first electrode parts 2401 and the second sensor electrode parts 242 of the second electrode parts 2402 are generally formed in the same process, it is possible to easily control the volume of the second sensor electrode part 242 by changing the surface area rather than the thickness of the second sensor electrode part 242. Accordingly, in this embodiment, the surface area of the second sensor portion 242a and the width of the second connecting portion 242b are changed. However, the present invention is not limited thereto, and the thicknesses of the second sensor electrode parts 242 of the first and second electrode parts 2401 and 2402 may be made set differently from each other. Furthermore, the shapes, surface areas or widths of the second sensor portions 242a and the second connecting portions 242b may be set differently from each other.

As described above, since the second sections P22 are positioned to occupy opposite lateral side regions, with the first section P21 disposed therebetween in the second direction, the second electrode parts 2402 may be disposed to occupy opposite lateral side regions of the touch panel 100 in the second direction. FIG. 7 illustrates an example in which the touch panel 100 is constituted by the first section P21, occupying the central region in the second direction, and the two second sections P22, positioned on respective lateral sides of the first section P21. In this case, the plurality of first electrode parts 2401 disposed in the first section P21 may have a uniform surface area, and the plurality of second electrode parts 2402 disposed in the second sections P22 may have a surface area that is uniform but larger than that of the plurality of first electrode parts 2401. Although the drawing illustrates an example in which the first section P21 is provided with three first electrode parts 2401 and each second section P22 is provided with one second electrode part 2402, the present invention is not limited as to the numbers of the first electrode parts 2401 and the second electrode parts 2402.

Furthermore, although FIG. 7 illustrates an example in which the touch panel 100 is composed of the first section P21 and the second sections P22, the present invention is not limited thereto. For example, as shown in FIG. 8, third sections P23 may be positioned between the first section P21, positioned in the central region in the second direction, and the second sections P22, positioned in opposite lateral side regions in the second direction. In this case, a third electrode part 2403 disposed in the third section P23 has a smaller resistance and a larger volume (for example, larger surface area) than the first electrode part 2401 disposed in the first section P21. When the plurality of third electrode parts 2403 are disposed in the third section P23, the third electrode parts 2403 may be configured to have resistances which decrease in stages and volumes (for example, surface areas) which increase in stages when moving toward the second section P22 from the first section P21. Consequently, the plurality of electrode parts 240 may have resistances which are decreased in stages and volumes or surface areas which are increased in stages when moving toward the second electrode parts 2402, disposed in the second section P22 from the first electrode part 2401, disposed in the first section P21, through the third section P23.

As described above, when the second electrode part 2402 disposed in the second section P22, is configured to have a relatively larger volume or surface area and thus a relatively lower resistance, it is possible to compensate for the reduction in touch accuracy in the second section P22, in which the size of the touch area is relatively reduced.

However, the present invention is not limited thereto. Even though the touch panel 100 has respective curvatures in the first and second directions, the second electrode 24 may have uniform volume, surface area or width. In addition, although the drawings illustrate a touch panel 100 that is curved in the first and second directions, another touch panel which has a curvature only in the second direction but not in the first direction also falls within the true spirit and scope of the invention. In this case, the first electrode 14 may have a uniform volume, surface area or width, and may have the configuration shown in FIG. 4 or 5 in order to solve the problem whereby a touch device cannot easily reach a peripheral area when the touch panel 100 has a large surface area. In addition, various other modifications are possible.

FIG. 7 or 8 illustrates the second electrode 24 including the first electrode parts 2401, disposed in the central region in the second direction, and the second electrode parts 2402, disposed in opposite lateral side regions in the second direction, in consideration only of the angle defined between the main image surface (MIS) and the touch area of the touch panel 100. However, when there is a curvature in the second direction, which is parallel to or slightly inclined with respect to the touch device as described above, an angle defined depending on properties of the touch device as well as an angle defined between the main image surface (MIS) and the touch area of the touch panel 100 may further be considered, unlike the curvature in the first direction. This is described in detail with reference to FIGS. 9 to 11.

FIG. 9 is a perspective view schematically showing the curved state of a display device including a touch panel according to a further embodiment of the present invention. FIG. 10 is a cross-sectional view schematically showing the touch device and the touch panel at portions A, B and C in FIG. 9. FIG. 11 is a plan view showing an example of the second electrode of the touch panel shown in FIG. 9.

Referring to FIG. 9, the display device 300 according to this embodiment has a curvature in the second direction (the vertical direction, that is, the y direction in the drawing) in a curved state.

In an upper portion (i.e. the "A" portion in FIG. 9) in the second direction, since a small acute angle A3 is defined between the touch panel 100 and a touch area of a touch device (particularly, the tip area of a finger) in the second direction, the touch area may be relatively increased. In the center portion (i.e. the "B" portion in FIG. 9) in the second direction, since a relatively small angle A4 is defined between the touch panel 100 and the touch area of the touch device and the portion is positioned at the center, the touch area may be relatively increased. Meanwhile, in a lower portion (i.e. the "C" portion in FIG. 9) in the second direction, since a relatively greater angle A5 is defined between the touch panel 100 and the touch area of the touch device (particularly, the tip area of a finger), the touch area may be relatively decreased.

Accordingly, the upper portion and the center portion in the second direction correspond to a first section P21, and the lower portion in the second direction corresponds to a second section P22.

Hence, the first electrode parts 1401, which have a relatively higher resistance and a relatively smaller volume (or smaller surface area) may be positioned at the upper section and the center section in the second direction, and the second electrode parts 1402, which have a relatively lower resistance and a relatively larger volume (or surface area), may be positioned at the lower section in the second direction. Therefore, this embodiment may be usefully applied to a touch panel in which a touch area of a touch device is positioned only at one side and a great difference may occur between upper and lower sections because of the larger surface area.

The first electrode (14 in FIG. 2) of the touch panel 100 may have the shape shown in FIG. 4 or 5, or the plurality of electrode parts may have uniform volume and surface area.

This embodiment illustrates the touch panel 100 in which the center portion in the second direction protrudes to be convex, and a finger is used as the touch device. In this embodiment, the upper portion and the center portion correspond to the first section P21, and the lower portion corresponds to the second section P22. However, the portion constituting the first section P21 and the portion constituting the second section P22 may be changed depending on the curved state. For example, when the center portion of the touch panel 100 in the second direction is recessed to be concave, the upper portion may correspond to the second section P22 and the center portion, and the lower portion may correspond to the first section P21. In addition, various other modifications are possible.

The above embodiments illustrate examples in which the first sensor electrode parts 142 or the second sensor electrode parts 242 disposed in the effective region AA have different surface areas. However, the present invention is not limited thereto. The first wiring parts 144 and/or the second wiring parts 244 may have different volumes to change the resistances thereof. This will be described in more detail with reference to FIG. 12.

Figure 12:
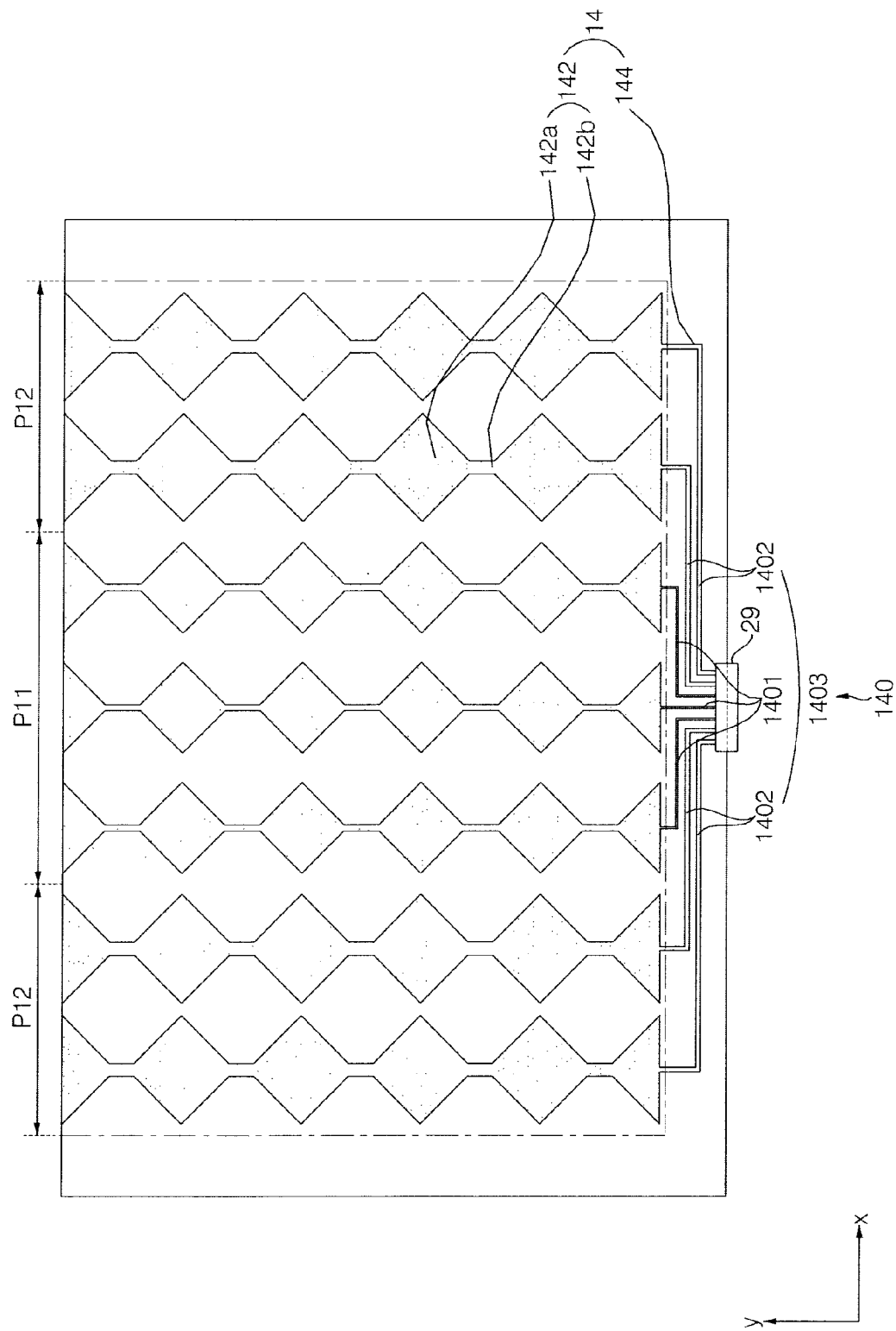
FIG. 12 is a plan view of a first electrode of a touch panel according to still another embodiment of the present invention.

FIG. 12 is a plan view of a first electrode of a touch panel according to still another embodiment of the present invention.

Referring to FIG. 12, in the touch panel according to this embodiment, first wiring parts 144 of a plurality of electrode parts 140 of a first electrode 14 have different widths.

More specifically, first wiring parts 144 of second electrode parts 1402 corresponding to the second section P12, positioned in opposite lateral side regions in the first direction, may have a larger width than that of first wiring parts 144 of the first electrode parts 1401 extending through the first section P11. Here, the first section P11 may be positioned in the center region, and the second sections P12 may be symmetrically positioned in the opposite lateral side regions.

Although FIG. 12 illustrates a touch panel which has only the first section P11 and the second sections P12, the present invention is not limited thereto. As shown in FIG. 5, third sections P13 may be additionally positioned between the first section P11 and the second sections P12, and the wiring parts 144 may have widths which are increased in stages when moving toward the first wiring part 144 of the second electrode part 1402, disposed in the second section P12, from the first wiring part 144 of the first electrodes part 1401, disposed in the first section P11.

Although this embodiment illustrates the touch panel in which the wiring parts 144 have different widths, the present invention is not limited thereto. Accordingly, the first wiring parts 144 of the plurality of electrode parts 140 may have different widths. The drawing illustrates an example in which the first sensor electrode parts 144 have the shape shown in FIG. 4. However, the present invention is not limited thereto. The first sensor electrode parts 142 of the plurality of electrode parts 140 may have a uniform surface area, or the first sensor electrode parts 142 of the plurality of electrode parts 140 may have the shape shown in FIG. 5 or various other shapes.

The first electrode 14 may be applied to various touch panels in a curved state. Particularly, the first electrode 14 may be applied to a touch panel having a curvature in the first direction, as shown in FIG. 1. However, the present invention is not limited thereto, and may be applied to a touch panel having other curved shapes.

The plurality of electrode parts (240 in FIG. 2) of the second electrode (24 in FIG. 2) may have uniform volume, surface area or width, or may have different volumes, surface areas or widths depending on the curved state of the touch panel 100.

Figure 13:
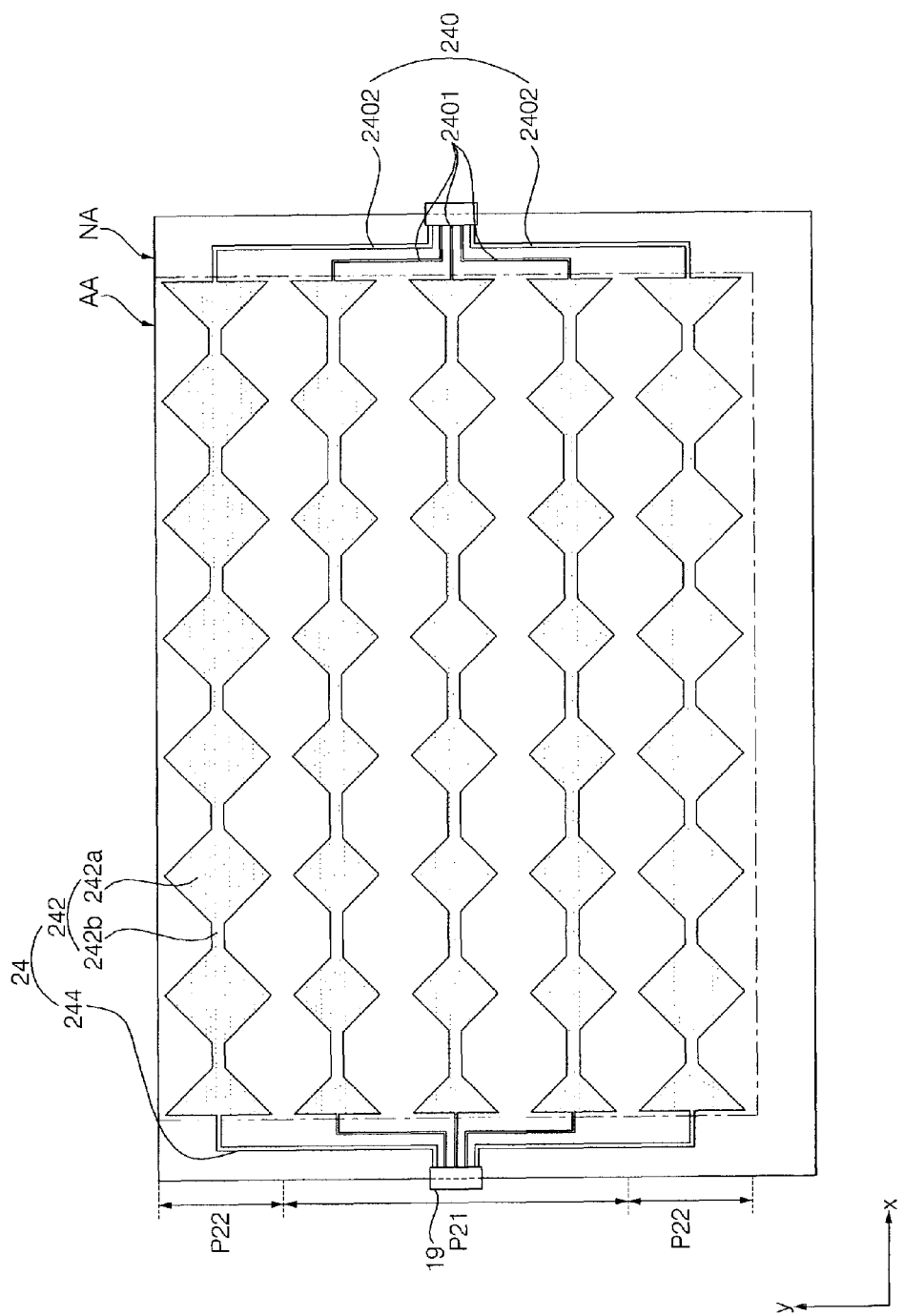
FIG. 13 is a plan view showing a second electrode of a touch panel according to still another embodiment of the present invention.

FIG. 13 is a plan view showing a second electrode of a touch panel according to still another embodiment of the present invention.

Referring to FIG. 13, the touch panel according to this embodiment is configured such that second wiring parts 244 of a plurality of electrode parts 240 of a second electrode 24 have different widths.

Specifically, the second wiring parts 244 of the second electrode parts 2402 disposed in the second section P22, positioned in opposite lateral side regions in the second direction, may have a greater width than that of the second wiring parts 244 of the first electrode parts 2401 extending through the first section P21 positioned in the center region in the second direction. Here, the first section P21 may be positioned in the center region, and the second sections P22 may be symmetrically positioned in opposite lateral side regions.

Although FIG. 13 illustrates the touch panel having only the first sections P21 and the second sections P22, the present invention is not limited thereto. Accordingly, as shown in FIG. 8, third sections P23 may be additionally positioned between the first section P21 and the second sections P22, and the second wiring parts may have widths which are increased in stages when moving toward the second wiring part 244 of the second electrode part 2402, disposed in the second section P22, from the second wiring part 244 of the first electrode part 2401, disposed in the first section P21.

Although the embodiment illustrates the second wiring parts 244 having different widths, the present invention is not limited thereto. Accordingly, the second wiring parts 244 of the plurality of electrode parts 240 may have different thicknesses. Furthermore, although the drawing illustrates second sensor electrode parts 242 having the shape shown in FIG. 7, the present invention is not limited thereto. The second sensor electrode parts 242 of the plurality of electrode parts 240 may have a uniform surface area, or the second electrode parts 242 of the plurality of electrode parts 240 may have the shape shown in FIG. 8 or various other shapes.

The second electrode 24 may be applied to various touch panels 100 in a curved state. Particularly, as shown in FIG. 6 or 9, the second electrode 24 may be applied to a touch panel in a curved state having a curvature in the second direction. However, the present invention is not limited thereto, and may be applied to a touch panel having another curved shape.

The plurality of electrode parts (140 in FIG. 2) of the first electrode (14 in FIG. 2) may have uniform volume, surface area or width, or may have different volumes, surface areas or widths.

Figure 14:
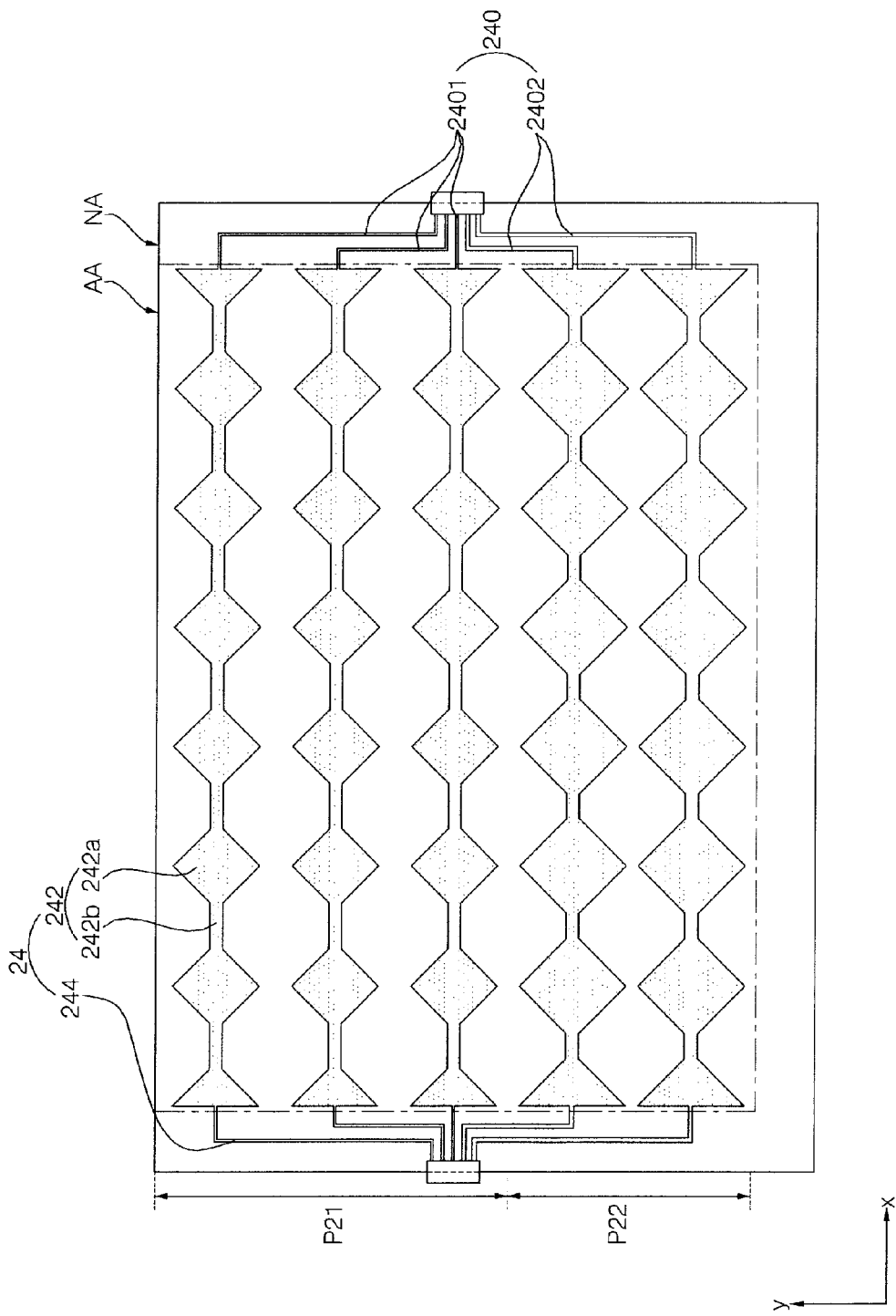
FIG. 14 is a plan view showing a second electrode of a touch panel according to still another embodiment of the present invention.

FIG. 14 is a plan view showing a second electrode of a touch panel according to still another embodiment of the present invention.

Referring to FIG. 14, a touch panel 100 according to this embodiment may be configured such thin the first section P21 is positioned in the upper region and the center region in the second direction (the vertical direction, that is, the y direction in the drawing) and the second section P22 is positioned in the lower region (a lateral side region). The second wiring parts 244 of the second electrode parts 2402, extending through the second section P22 positioned in the lower region in the second direction, may, have a greater width than that of the second wiring parts 244 of the first electrode parts 2401, extending through the first section P21 positioned in the upper and center regions in the second direction.

Although the embodiment illustrates the second wiring parts 244 having different widths, the present invention is not limited thereto. Accordingly, the second wiring parts 244 of the plurality of electrode parts 240 may have different thicknesses. Furthermore, although the drawing illustrates the second sensor electrode parts 242 having the shape shown in FIG. 7, the present invention is not limited thereto. The second electrode parts 242 of the plurality of electrode parts 240 may have a uniform surface area or may have various other shapes.

The second electrode 24 may be applied to various touch panels in a curved state. Particularly, the second electrode 24 may be applied to the touch panel 100 in a curved state having a curvature in the second direction, as shown in FIG. 6 or 9. However, the present invention is not limited thereto, and may be applied to a touch panel 100 having another curved shape.

The plurality of electrode parts (140 in FIG. 2) of the first electrode (14 in FIG. 2) may have uniform volume, surface area or width, or may have different volumes, surface areas or widths.

The embodiment illustrates an example in which the touch panel 100 is convex in the center regions in the second direction and in which a finger is used as the touch device. Here, the upper and center regions constitute the first section P21 and the lower region constitutes the second section P22. However, the region constituting the first section P21 and the region constituting the second section P22 may be changed depending on the curved state. For example, when the center region of the touch panel 100 in the second direction is recessed to be concave, the upper region may constitute the second section P22 and the center and lower regions may constitute the first section P21. In addition, various other modifications are possible.

In the plurality of electrode parts 140 of the first electrode 14 according to this embodiment, the shape, volume or width of at least one of the first sensor portions 142*a* and the first connecting portions 142*b* of the first sensor electrode parts 142 and the first wiring parts 144 may be changed. In addition, in the plurality of electrodes 240 of the second electrode 24 according to this embodiment, the shape, volume or width of at least one of the second sensor portions 242*a* and the second connecting portions 242*b* of the second sensor electrode parts 242 and the second wiring parts 244 may also be changed.

The above embodiments illustrate the first electrode 14, in which the first sensor electrode parts 142 include the plurality of first sensor portions 142*a* having a rhombic shape and first connecting portions 142*b* connected between the first sensor portions 142*a*. Similarly to the first electrode 14, the above embodiments illustrate the second electrode 24 in which the second sensor electrode parts 242 include the plurality of second sensor portions 242*a* having a rhombic shape and the connecting portions 242*b* connected between the second sensor portions 242*a*. However, the present invention is not limited thereto, and the structures, shapes and the like of the first and second sensor portions 142*a* and 242*a* and the first and second connecting portions 142*b* and 242*b* may be variously changed.

Figure 15:
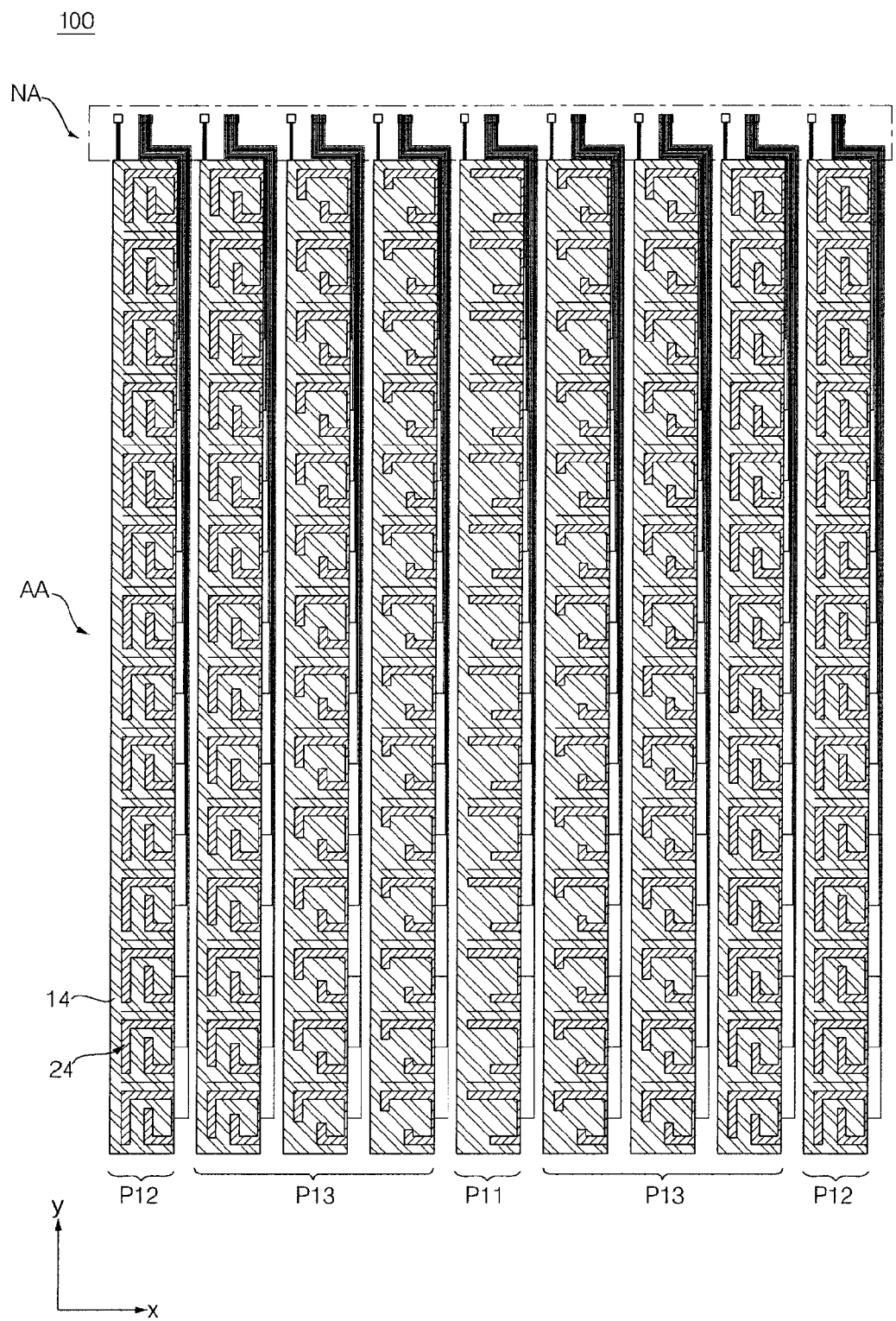
FIG. 15 is a plan view showing a touch panel according to still another embodiment of the present invention.
Figure 16:
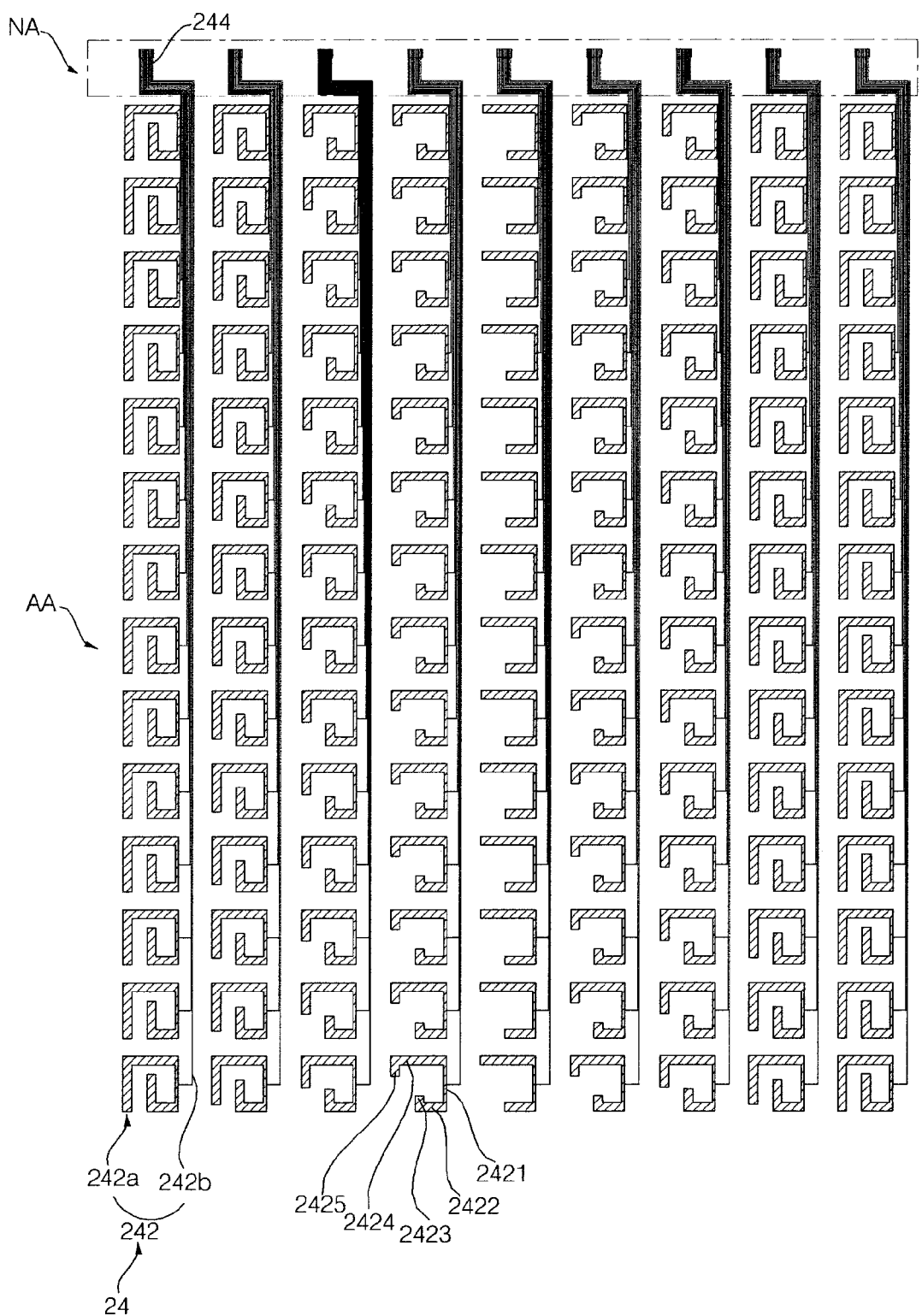
FIG. 16 is a plan view showing a second electrode of the touch panel shown in FIG. 15.
Figure 17:
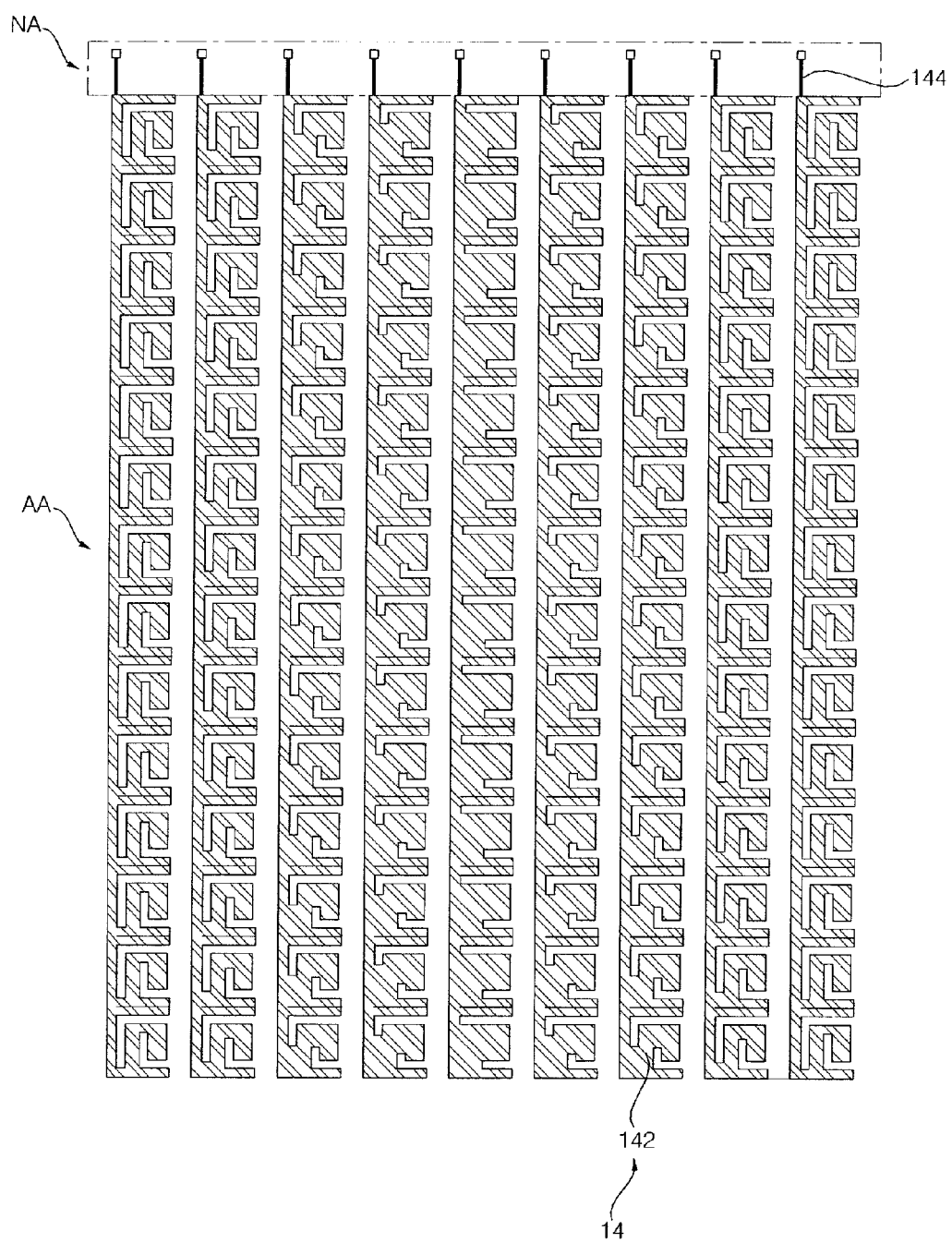
FIG. 17 is a plan view showing a first electrode of the touch panel shown in FIG. 15.

Another example of the first and second electrodes 14 and 24 will be described with reference to FIGS. 15 to 17. FIG. 15 is a plan view showing a touch panel according to still another embodiment of the present invention. FIG. 16 is a plan view showing a second electrode of the touch panel shown in FIG. 15. FIG. 17 is a plan view showing a first electrode of the touch panel shown in FIG. 15. FIGS. 15 to 17 mainly illustrate the first and second electrodes 14 and 24 for clear and simplified illustration.

Referring the FIGS. 15 to 17, a first electrode 14 may include a plurality of first electrode parts which are spaced apart from each other in the first direction (the x direction in the drawing) and extend in the second direction (the y direction in the drawing). A second electrode 24 may include a plurality of second electrode parts which are spaced apart from each other and extend in the second direction. In this configuration, since non-effective regions (NA in FIG. 2) are not provided at opposite lateral side areas, the surface area of the effective region AA of the touch panel 100 can be maximized.

According to this embodiment, second sensor electrode parts 242 of the second electrode 24 may include second sensor portions 242*a*, composed of a plurality of sub portions 2421, 2422, 2423, 2424 and 2425, and second connecting portions 242*b* extending from the second sensor portions 242*a*. For example, each of the sub portions 2421, 2422, 2423, 2424 and 2425 may include a first sub portion 2421, a second sub portion 2422, a third sub portion 2423, a fourth sub portion 2424 and a fifth sub portion 2425.

More specifically, each second sensor portion 242*a* may include the first sub portion 2421 extending in the second direction, the second sub portion 2422 extending from an end of the first sub portion 2421 in the first direction, the third sub portion 2423 extending from an end of the second sub portion 2422 in the second direction, the fourth sub portion 2424 extending from the other end of the first sub portion 2421 in the first direction, and the fifth sub portion 2425 extending from an end of the fourth sub portion 2424 in the second direction. The third sub portion 2423 may extend toward the fourth sub portion 2424, and the fifth sub portion 2425 may extend toward the second sub portion 2422. The first connecting portions 242*b* connected to the respective second sensor portions 242*a* may be spaced apart from each other and may extend to the non-effective region NA in the second direction.

The first sensor electrode part 142 may be configured to have a shape that is complementary to the second sensor portion 242*a* and may extend in the second direction. The first sensor electrode part 142 may have a shape which varies in accordance with the shape of the second sensor portion 242*a*.

In other words, the first sensor electrode part 142 and the second sensor electrode part 242 may be disposed in the same plane as the base member and may have shapes that are complementary to each other. Consequently, a unit region constituted by the first sensor portion 242*a* and the first sensor electrode part 142, which correspond to each other, may have a rectangular shape.

Among the plurality of electrode parts 240 of the second electrode 24, the third sub portion 2423 and the fifth sub portion 2425 of the first electrode part 2401 disposed in the first section P11, may be longer than the third sub portion 2423 and the fifth sub portion 2425 of the second electrode part 2402, disposed in the second section P22. When the third sections P23 are provided, the third sub portion 2423 and the fifth sub portion 2425 may have lengths that increase in stages when moving toward the second electrode part 2402 from the first electrode part 2401.

Accordingly, the surface area at which the first sensor electrode parts 142 and the second sensor electrode parts 242 are coupled to each other in the first section P11 is relatively smaller, whereas the surface area at which the first sensor electrode parts 142 and the second sensor electrode parts 242 are coupled to each other in the second section P12 is relatively larger. Consequently, touch sensitivity in the second section P12 can be improved and thus the overall touch sensitivity can be uniform.

In this embodiment, the first sensor electrode part 142 and the second sensor electrode part 242 have different shapes such that touch sensitivity is controlled by the coupling area therebetween. However, the present invention is not limited thereto, and the touch sensitivity may also be controlled by adjusting the volumes, surface areas or widths of the first and second sensor electrode parts 142 and 242. The drawings and the description illustrate an example in which a curvature is provided in the first direction and the first section P11 and the second sections P12 are disposed in the first direction. However, the present invention is not limited thereto, and the first section and the second section may be disposed in various manners in the first and second directions depending on the curved structure of the touch panel 100.

Although the drawings and the description illustrate an example in which the first sensor electrode part 142 and the second sensor electrode part 242 have different shapes, the first and second wiring parts 144 and 244 and the like may have different widths.

Although the above embodiments illustrate examples in which the curvatures are configured to be symmetrical at both lateral sides in the first and/or second directions, various modifications, such as the case in which a curvature is provided on only one side in the first and/or second directions in order to realize a convex shape.

Furthermore, the above embodiments illustrate examples in which the resistances of the first and second electrodes 14 and 24 and the resulting electric current are controlled by varying the shapes thereof in order to realize uniform touch sensitivity. However, the present invention is not limited thereto, and the electric current may also be controlled by changing voltages applied to the first and second electrodes 14 and 24. Specifically, the voltage applied to the second electrode parts 1402 and 2402 of the first electrode 14 and/or the second electrode 24, disposed in the second section P12 and P22, may be higher than that applied to the first electrode parts 1401 and 2401 of the first electrode 14 and/or the second electrode 24, disposed in the first sections P11 and P21. Consequently, current values at the first electrode parts 1401 and 2401 and the second electrode parts 1402 and 2402 may be made similar to each other, thus realizing uniform touch sensitivity.

As described above, the present invention ensures a sufficient touch area in the second section, in which the touch area would be otherwise reduced, thus improving touch sensitivity and imparting uniform touch sensitivity in a curved state. As a result, it is possible to provide excellent and accurate touch sensitivity even in a curved state.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as being included in the scope and spirit of the invention as disclosed in the accompanying claims.

Therefore, the present invention has been made in view of the above problems, and it is an object of the present invention to provide a touch panel and a display device including the same which ensure excellent and accurate touch sensitivity even in a curved state.

In accordance with an aspect of the present invention, the above and other objects can be accomplished by the provision of a touch panel in a curved state including a first electrode that includes a plurality of electrode parts spaced apart from each other. The plurality of electrode parts includes a first electrode part that extends through the center region of the touch panel and a second electrode part extending through a lateral side region of the touch panel. The second electrode part has a lower resistance than does the first electrode part.

In accordance with another aspect of the present invention, a touch panel in a curved state includes a first electrode that includes a plurality of electrode parts that are spaced apart from each other. Assuming that a plane defined by lines connecting apexes of the touch panel in a curved state or a plane having the maximum area in the touch panel in a curved state is defined as a main image surface (MIS), the touch panel in a curved state includes a first section defining a first angle with respect to the main image surface and a second section defining a second angle, which is greater than the first angle, with respect to the main image surface. The plurality of electrode parts includes a first electrode part extending through the first section and a second electrode part extending through the second section. The second electrode part has a lower resistance than the first electrode part.

In accordance with an aspect of the present invention, the above and other objects can be accomplished by the provision of a display device including the touch panel, and a display panel disposed at least behind the touch panel to display an image.

According to the present invention, the second electrode part disposed in the second section at which a touch area is relatively smaller in a curved state has a larger volume or surface area and a lower resistance than does the first electrode part disposed in the first section, in which a touch area is relatively larger in a curved state. Accordingly, the present invention ensures a sufficient touch area in the second section, in which the touch area would otherwise be reduced, thus improving touch sensitivity and imparting uniform touch sensitivity in a curved state. As a result, it is possible to provide excellent and accurate touch sensitivity even in a curved state.

The above references are incorporated by reference herein where appropriate for appropriate teachings of additional or alternative details, features and/or technical background.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel having a curved form comprising:
a first electrode including a first plurality of electrode parts spaced, in a first direction, apart from each other,
wherein the first plurality of electrode parts include a first electrode part and a second electrode part, the first electrode part extending in a second direction through a center region of the touch panel in the first direction, and the second electrode part extending in the second direction through a lateral side region of the touch panel in the first direction,
wherein a resistance of the second electrode part is less than a resistance the first electrode part,
wherein each of the first and second electrode parts includes a first sensor electrode part disposed in an effective region of the touch panel, and a first wiring part disposed in a non-effective region of the touch panel, and
wherein each of the first sensor electrode parts includes a plurality of first sensor portions and a plurality of first connecting portions, wherein at least one of the first connecting portions is connected between two of the plurality of first sensor portions, and
wherein a surface area of one of the plurality of first sensor portions of the second electrode part is greater than a surface area of one of the plurality of first sensor portions of the first electrode part.

2. The touch panel according to claim 1,
wherein a width of one of the plurality of first connecting portions of the second electrode part is larger than a width of one of the plurality of first connecting portions of the first electrode part.

3. The touch panel according to claim 1, wherein a width of the first wiring part of the second electrode part is greater than a width of the first wiring part of the first electrode part.

4. The touch panel according to claim 1, wherein the first plurality of electrode parts include a third electrode part disposed between the first electrode part and the second electrode part, the third electrode part extending in the second direction,
wherein a resistance of the third electrode part is greater than a resistance of the first electrode part, and the resistance of the third electrode part is less than a resistance of the second electrode part.

5. The touch panel according to claim 4, wherein at least one of a width, a surface area and a thickness of the first plurality of electrode parts increases in stages in a direction from the first electrode part toward the second electrode part.

6. The touch panel according to claim 1, wherein the first direction is a horizontal direction of the touch panel, and the second electrode part is disposed on both lateral sides of the touch panel in the horizontal direction.

7. The touch panel according to claim 1, wherein the first direction is a vertical direction of the touch panel, and the second electrode part includes a plurality of second electrode parts disposed on both lateral sides of the touch panel in the vertical direction or the second electrode part is disposed on one lateral side of the touch panel in the vertical direction.

8. The touch panel according to claim 1, wherein the touch panel has a curvature in the first direction, the touch panel further comprising:
a second electrode including a second plurality of electrode parts spaced, in the second direction, apart from each other, wherein the second direction is transverse to the first direction,
wherein the second plurality of electrode parts includes a first electrode part and a second electrode part, the first electrode part of the second electrode extending in the first direction through a center region of the touch panel in the second direction, and the second electrode part extending in the first direction through a lateral side region of the touch panel in the second direction.

9. The touch panel according to claim 8, wherein at least one of a width, a surface area and a thickness is greater at the second electrode part of the second electrode than at the first electrode part of the second electrode,
wherein the second electrode part of the second electrode is disposed on at least one lateral side of the first electrode part of the second electrode.

10. The touch panel according to claim 9, wherein each of the first and second electrode parts of the second electrode includes a second sensor electrode part disposed in an effective region of the touch panel, and a second wiring part disposed in a non-effective region of the touch panel,
wherein at least one of the second sensor electrode part and the second wiring part of the second electrode has a greater width or surface area at the second electrode part than at the first electrode part.

11. The touch panel according to claim 9, wherein the touch panel having the curved form is convex forward at the center region in the second direction, the first electrode part of the second electrode being disposed at upper and center regions in the second direction, and the second electrode part of the second electrode being disposed at a lower region in the second direction, or
wherein the touch panel having the curved form is concave forward at the center region in the second direction, the first electrode part of the second electrode being disposed in lower and center regions in the second direction, and the second electrode part of the second electrode being disposed in an upper region in the second direction.

12. The touch panel according to claim 1, wherein the touch panel is fixed to have the curved form or is flexible to have another form different from the curved form.

13. A display device comprising:
the touch panel of claim 1; and
a display panel disposed at least behind the touch panel to display an image.

14. A touch panel in a curved form comprising:
a first electrode including a plurality of electrode parts spaced apart from each other,
wherein a main image surface (MIS) is a plane defined by lines connecting apexes of the touch panel in a curved form or a plane having a maximum area in the touch panel in a curved form, the touch panel in a curved form includes a first section and a second section, the first section defining a first angle with respect to the main image surface, and the second section defining a second angle greater than the first angle with respect to the main image surface,
wherein the plurality of electrode parts include a first electrode part and a second electrode part, the first electrode part extending through the first section, and the second electrode part extending through the second section,
wherein a resistance at the second electrode part is less than a resistance at the first electrode part.

15. The touch panel according to claim 14, wherein at least one of a width, a surface area and a thickness is greater at the second electrode part than at the first electrode part.

16. The touch panel according to claim 14, wherein the touch panel having the curved form has a curvature in a first direction,
   wherein the first section is a center region in the first direction, and the second section is a region on a lateral side of the first section, and the second section extends in the second direction.

17. The touch panel according to claim 14, wherein the second section is disposed on both lateral sides in the first direction when the first direction is a horizontal direction, and the second section is disposed on one lateral side or both lateral sides in the first direction when the first direction is a vertical direction.

\* \* \* \* \*